US010523837B1

(12) United States Patent
Wada et al.

(10) Patent No.: US 10,523,837 B1
(45) Date of Patent: Dec. 31, 2019

(54) IMAGE PROCESSING APPARATUS FOR SYNTHESIZING A FRONT-SURFACE IMAGE AND A BACK-SURFACE IMAGE

(71) Applicant: PFU LIMITED, Kahoku-shi, Ishikawa (JP)

(72) Inventors: Tomoaki Wada, Kahoku (JP); Takeshi Yokogawa, Kahoku (JP)

(73) Assignee: PFU LIMITED, Kahoku-Shi, Ishikawa (JP)

( * ) Notice: Subject to any disclaimer, the term of this patent is extended or adjusted under 35 U.S.C. 154(b) by 0 days.

(21) Appl. No.: 16/208,415

(22) Filed: Dec. 3, 2018

(30) Foreign Application Priority Data

Aug. 24, 2018 (JP) .................... 2018-157592

(51) Int. Cl.
*H04N 1/00* (2006.01)
*H04N 1/12* (2006.01)
*H04N 1/409* (2006.01)

(52) U.S. Cl.
CPC ......... *H04N 1/121* (2013.01); *H04N 1/00602* (2013.01); *H04N 1/00628* (2013.01); *H04N 1/00718* (2013.01); *H04N 1/00748* (2013.01); *H04N 1/4092* (2013.01)

(58) Field of Classification Search
None
See application file for complete search history.

(56) References Cited

U.S. PATENT DOCUMENTS

| 2015/0281519 A1 | 10/2015 | Tsugimura |
| 2016/0191734 A1* | 6/2016 | Yu ...................... H04N 1/00748 358/450 |
| 2017/0257495 A1* | 9/2017 | Kanaya .............. H04N 1/00013 |

FOREIGN PATENT DOCUMENTS

| JP | 2010-154112 A | 7/2010 |
| JP | 2015-198306 A | 11/2015 |
| JP | 2016-127330 A | 7/2016 |
| JP | 2017-208627 A | 11/2017 |

* cited by examiner

*Primary Examiner* — Andrew H Lam
(74) *Attorney, Agent, or Firm* — Lewis Roca Rothgerber Christie LLP

(57) ABSTRACT

An image processing apparatus includes a processor for generating a front-surface image captured of a front surface of a conveyed document and a back-surface image captured of a back surface of the conveyed document, detecting a feature of the conveyed document, determining whether a first end of the front-surface image and a second end of the back-surface image corresponding to the first end are continuous, based on the generated front-surface image and back-surface image and the detected feature, and synthesizing the front-surface image and the back-surface image when it has been determined that the first end and the second end are continuous.

11 Claims, 15 Drawing Sheets

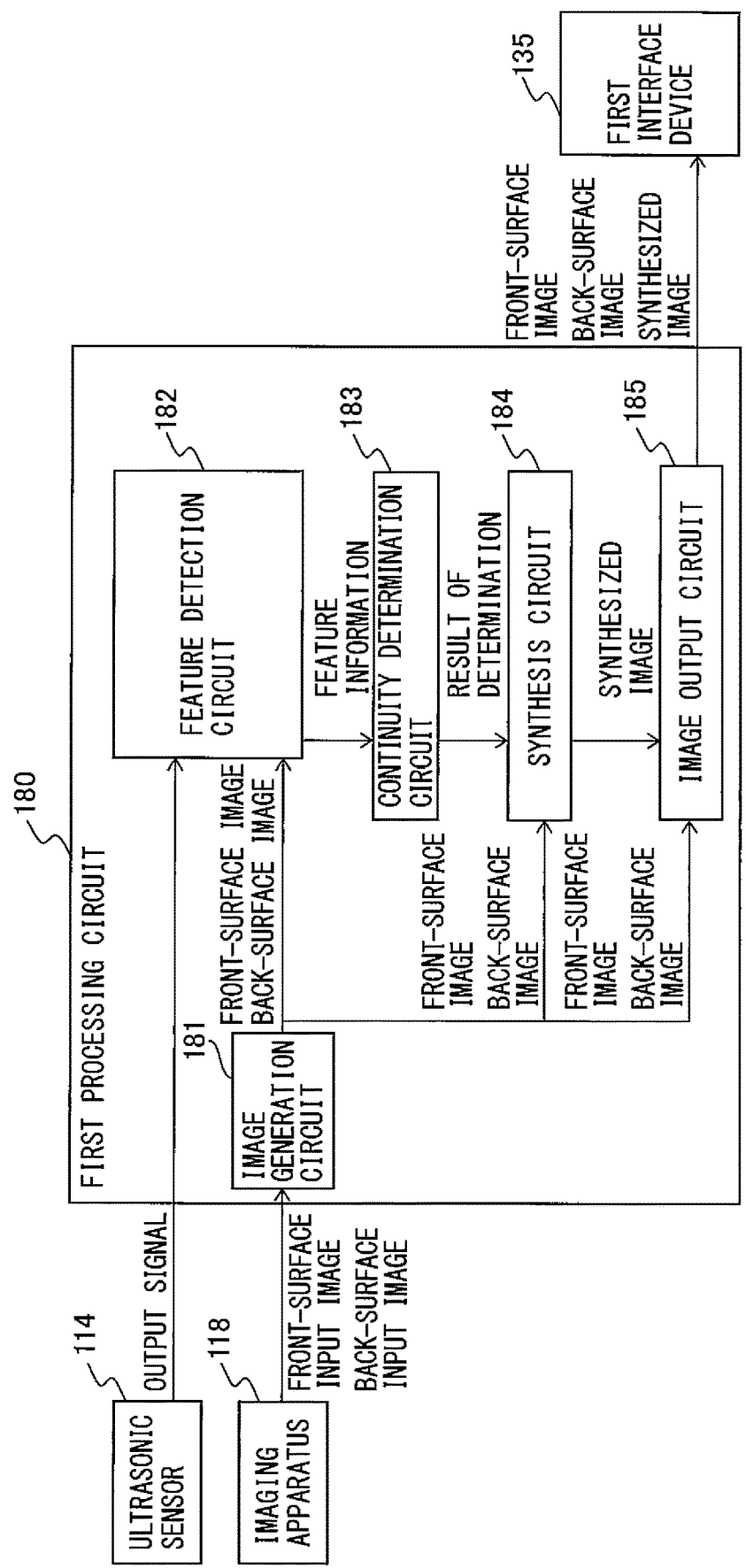

IMAGE PROCESSING APPARATUS FOR SYNTHESIZING A FRONT-SURFACE IMAGE AND A BACK-SURFACE IMAGE

CROSS-REFERENCE TO RELATED APPLICATIONS

This application is based upon and claims the benefit of priority of prior Japanese Patent Application No. 2018-157592, filed on Aug. 24, 2018, the entire contents of which are incorporated herein by reference.

TECHNICAL FIELD

The present invention relates to image processing technology.

BACKGROUND

Generally, image processing apparatuses, such as scanners that capture an image of a document while the document is conveyed, have a separating function for separating documents, separates a plurality of documents placed on the document tray of the apparatus and conveys the documents one by one. However, when a document folded in two etc., is conveyed, an attempt to separate the document may cause a damage on the document or a jam during the separation of the document. When a document folded in two is to be conveyed, therefore, the user makes a setting on the image processing apparatus to suspend the separating function thereof before having the document conveyed. Further, image processing apparatuses generally have an imaging device that captures an image of the front surface of the document and an imaging device that captures an image of the back surface of the document to capture the images of the front surface and the back surface of the document at once. In other words, when a document folded in two is conveyed, the image processing apparatus captures the images of the external sides of the document folded in two at once. In such a case, an image of a continuous document is captured in the two images captured by the two imaging devices, and it is preferable for the image processing device to synthesize the two images.

For example, an image processing apparatus can determine whether or not to synthesize the image captured of the front surface of the document and the image captured of the back surface of the document according to the setting made on whether or not the separating function is to be suspended. However, when thin sheets of paper, documents with a tear, perforated documents, or documents with a sticker or a photograph attached thereto are conveyed, an attempt to separate the documents may damage the document. Therefore, the image processing apparatus may have been set to suspend the separating function even when a document not folded in two is to be conveyed. An image processing apparatus that can determine appropriately whether or not to synthesize the image captured of the front surface and the image captured of the back surface is desired.

There is disclosed an image processing apparatus including a multifeed detection means for detecting a multifeed of a document by using an ultrasonic multifeed sensor and an operation means for designating an operation following the detection of a multifeed, wherein the image of the front surface and the image of the back surface of the document on which a multifeed has been detected are combined, based on the operation on the operation means (see Japanese Unexamined Patent Publication (Kokai) No. 2017-208627).

There is disclosed an image reading apparatus wherein an image captured of the front surface of the document and an image captured of the back surface of the document are combined to form one image when the apparatus is set at a large-sized sheet reading mode and it has been determined that the document conveyed is folded in half, based on the result of the reception by an ultrasonic receiver (see Japanese Unexamined Patent Publication (Kokai) No. 2010-154112).

There is disclosed a reading apparatus that, upon receiving an instruction to read both sides of a document folded in two, synthesizes the images of the both sides to form one image (see Japanese Unexamined Patent Publication (Kokai) No. 2016-127330).

SUMMARY

Technical Problem

It would be cumbersome for a user to instruct an image processing apparatus to synthesize images. Therefore, an image processing apparatus is desired that determines whether or not a conveyed document is a kind of document for which it is appropriate to synthesize the image captured of the front surface thereof and the image captured of the back surface thereof and decides automatically whether or not to synthesize the two images.

It is an object to provide an image processing apparatus, a control method, and a computer-readable, non-transitory medium storing a computer program for accurately determining whether or not a conveyed document is a kind of document for which it is appropriate to synthesize the image captured of the front surface thereof and the image captured of the back surface thereof.

According to an aspect of the apparatus, there is provided an image processing apparatus. The image processing apparatus includes a processor for generating a front-surface image captured of a front surface of a conveyed document and a back-surface image captured of a back surface of the conveyed document, detecting a feature of the conveyed document, determining whether a first end of the front-surface image and a second end of the back-surface image corresponding to the first end are continuous, based on the generated front-surface image and back-surface image and the detected feature, and synthesizing the front-surface image and the back-surface image when it has been determined that the first end and the second end are continuous.

According to an aspect of the method, there is provided a control method of an image processing apparatus. The method includes generating a front-surface image captured of a front surface of a conveyed document and a back-surface image captured of a back surface of the conveyed document, detecting a feature of the conveyed document, determining whether a first end of the front-surface image and a second end of the back-surface image corresponding to the first end are continuous, based on the generated front-surface image and back-surface image and the detected feature, and synthesizing the front-surface image and the back-surface image when it has been determined that the first end and the second end are continuous.

According to an aspect of the computer-readable, non-transitory medium storing a computer program, there is provided a computer-readable, non-transitory medium storing a computer program, wherein the computer program causes an image processing apparatus to execute a process. The process includes generating a front-surface image captured of a front surface of a conveyed document and a back-surface image captured of a back surface of the conveyed document, detecting a feature of the conveyed document, determining whether a first end of the front-surface image and a second end of the back-surface image corresponding to the first end are continuous, based on the generated front-surface image and back-surface image and the detected feature, and synthesizing the front-surface image and the back-surface image when it has been determined that the first end and the second end are continuous.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 13 is a block diagram depicting a schematic configuration of a first processing circuit according to another embodiment.

DESCRIPTION OF EMBODIMENTS

Hereinafter, an image processing apparatus, a control method, and a computer-readable, non-transitory medium storing a computer program according to an embodiment, will be described with reference to the drawings. However, note that the technical scope of the invention is not limited to these embodiments and extends to the inventions described in the claims and their equivalents.

Figure 1:
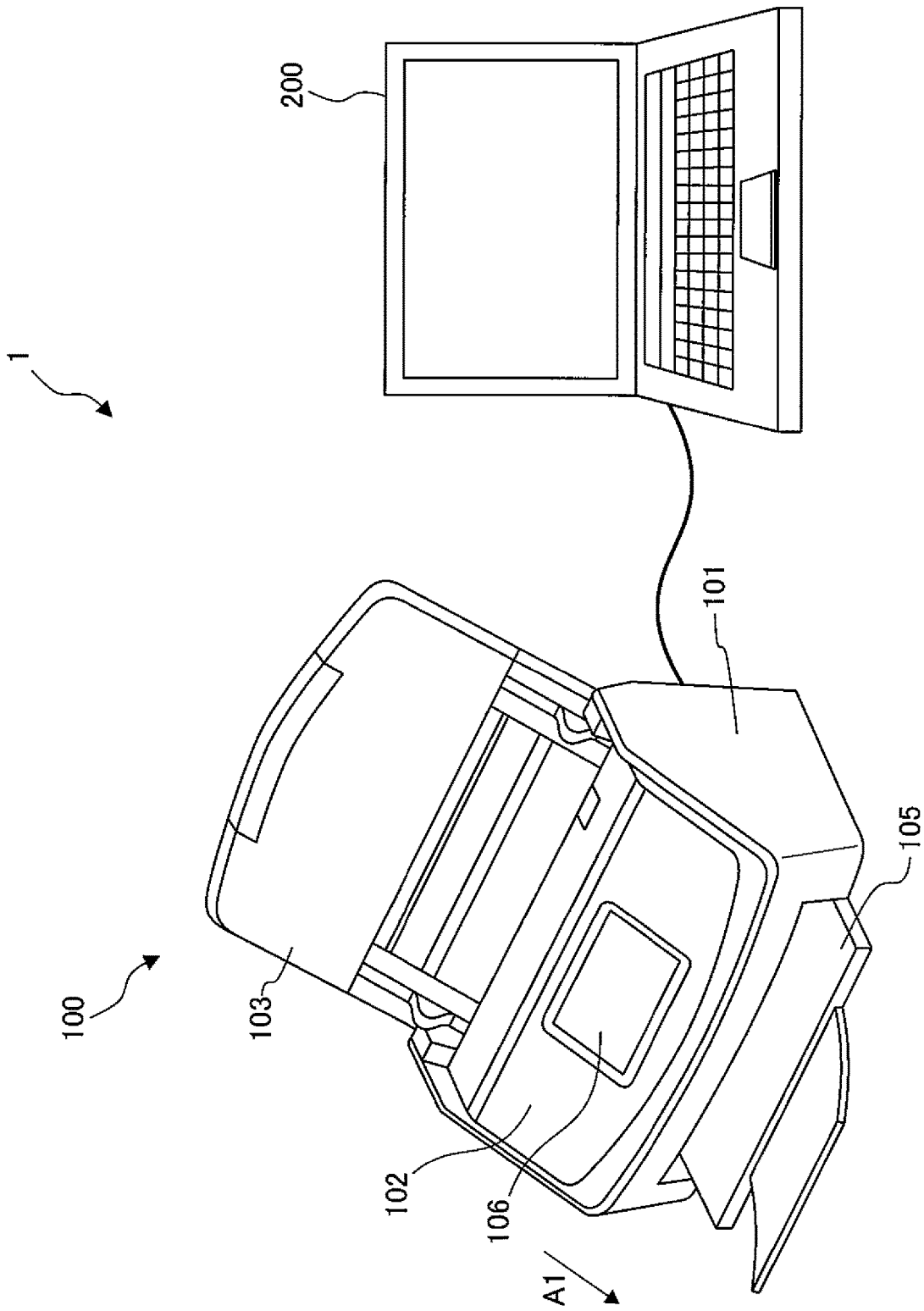
FIG. 1 is a configuration view of an example of an image processing system according to an embodiment.

FIG. 1 is a configuration view of an example of an image processing system 1 according to an embodiment.

The image processing system 1 includes an image reading apparatus 100 and an information processing apparatus 200. The image reading apparatus 100 is an example of the image processing apparatus, such as an image scanner. The image reading apparatus 100 may be a photocopier, a facsimile, or a multifunction peripheral (MFP). The information processing apparatus 200 is another example of the image processing apparatus, such as a personal computer, a multifunctional mobile terminal, or a mobile phone. The image reading apparatus 100 and the information processing apparatus 200 are mutually connected.

The image reading apparatus 100 includes a lower housing 101, an upper housing 102, a document tray 103, a discharging tray 105, a display operation device 106, etc.

The upper housing 102 is arranged at a position for covering the upper surface of the image reading apparatus 100 and engaged with the lower housing 101. The document tray 103 is arranged at a position on which documents can be placed and functions as a document placing tray. The discharging tray 105 retains discharged documents.

The display operation device 106 is an example of a display device and an operation device. The display operation device 106 has a display composed of liquid crystal, organic EL (Electro-Luminescence), etc., and an interface circuit that outputs image data on the display so as to display image data on the display. The display operation device 106 further includes a touch-panel style input device and an interface circuit that acquires signals from the input device so as to receive an operation by a user and output signals according to an input by the user. Note that a display device and an operation device may be separately provided.

Figure 2:
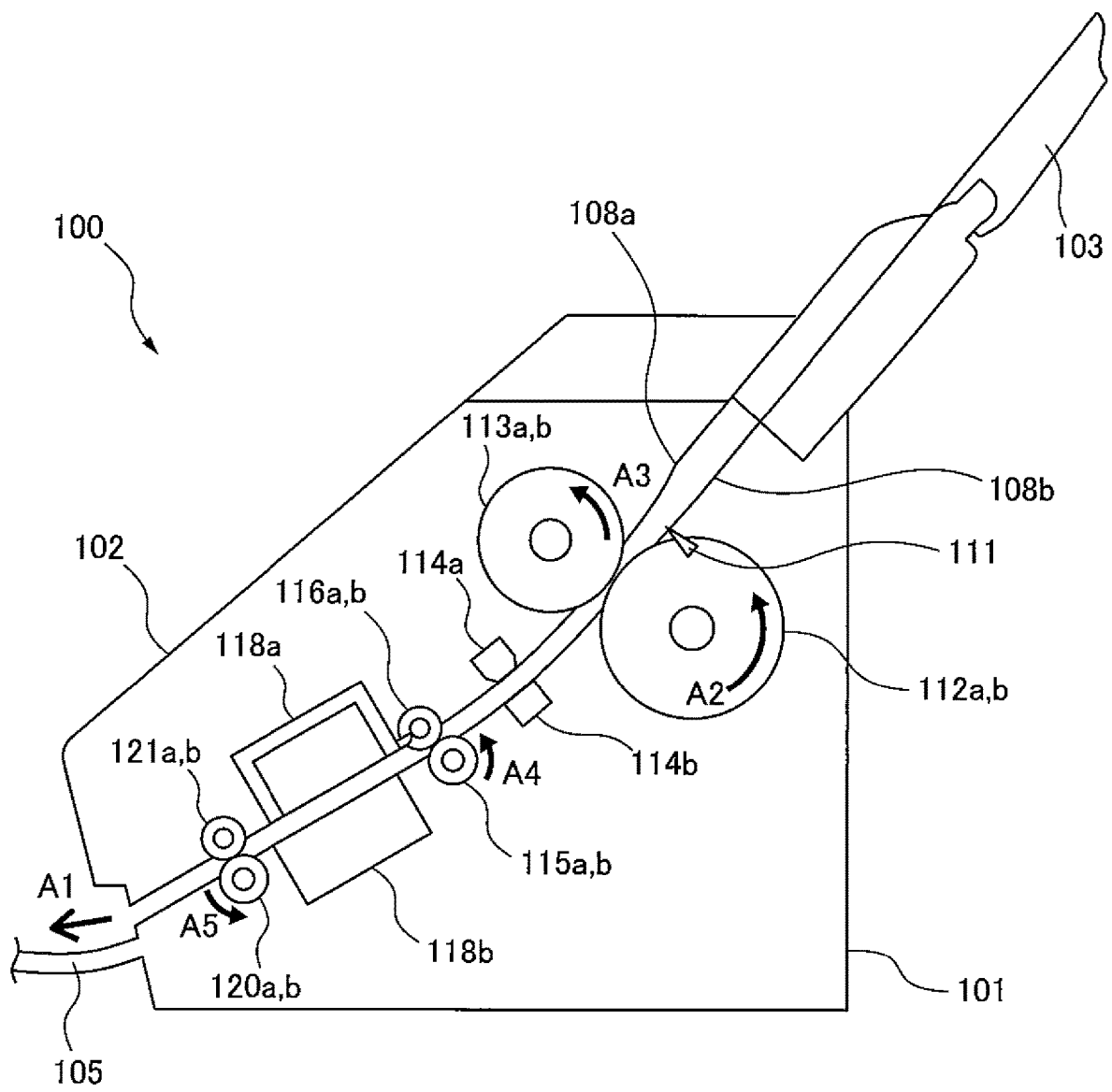
FIG. 2 is a view for illustrating a conveyance path inside an image reading apparatus.

FIG. 2 is a view for illustrating a conveyance path inside the image reading apparatus 100.

The conveyance path inside the image reading apparatus 100 includes: a first sensor 111, feed rollers 112a, 112b, retard rollers 113a, 113b, an ultrasonic transmitter 114a, an ultrasonic receiver 114b, first conveyance rollers 115a, 115b, first driven rollers 116a, 116b, a first imaging device 118a, a second imaging device 118b, second conveyance rollers 120a, 120b, and second driven rollers 121a, 121b.

Hereinafter, the feed rollers 112a, 112b may be collectively referred to as the feed roller 112. Likewise, the retard rollers 113a, 113b may be collectively referred to as the retard roller 113. The first conveyance rollers 115a and 115b may be collectively referred to as the first conveyance roller 115. The first driven rollers 116a and 116b may be collectively referred to as the first driven roller 116. The second conveyance rollers 120a and 120b may be collectively referred to as the second conveyance roller 120. The second driven rollers 121a and 121b may be collectively referred to as the second driven roller 121. The first imaging device 118a and the second imaging device 118b may be collectively referred to as the imaging device 118.

The lower surface of the upper housing 102 forms an upper guide 108a of the document conveyance path, while the upper surface of the lower housing 101 forms a lower guide 108b of the document conveyance path. In FIG. 2, an arrow A1 indicates a document conveyance direction. Hereinafter, upstream refers to upstream of the document conveyance direction A1; downstream refers to downstream of the document conveyance direction A1.

The first sensor 111 is a contact detecting sensor, is arranged on the upstream side of the feed roller 112 and retard roller 113 and detects whether or not a document is placed on the document tray 103.

The ultrasonic transmitter 114a and the ultrasonic receiver 114b are arranged in proximity to the conveying route for the documents so as to face each other with the conveying route interposed therebetween. The ultrasonic transmitter 114a transmits an ultrasonic wave. On the other hand, the ultrasonic receiver 114b detects the ultrasonic wave that has been transmitted by the ultrasonic transmitter 114a and that has passed through a document, and generates and outputs an output signal which is an electric signal according to the received ultrasonic wave. In the following explanation, the ultrasonic transmitter 114a and the ultrasonic receiver 114b may be collectively referred to as the ultrasonic sensor 114.

The first imaging device 118a is an example of an imaging module and includes a contact image sensor (CIS) of a unit magnification optical system type that has an imaging elements using charge coupled devices (CCD) linearly arranged in the main scanning direction. Further, the first imaging device 118a has a lens that forms an image on the imaging elements and an A/D (analog to digital) converter that amplifies the electric signals outputted from the imaging elements and converts the analog signals to digital signals (A/D). The first imaging device 118a generates and outputs a back-surface input image, which is an image captured of the back surface of the conveyed document.

The second imaging device 118b is an example of an imaging module and includes a CIS of a unit magnification optical system type that has an imaging elements using CCD linearly arranged in the main scanning direction. Further, the second imaging device 118b has a lens that forms an image on the imaging elements and an A/D (analog to digital) converter that amplifies the electric signals outputted from the imaging elements and converts the analog signals to digital signals (A/D). The second imaging device 118b generates and outputs a front-surface input image, which is an image captured of the front surface of the conveyed document.

Note that the first imaging device 118a and the second imaging device 118b may use Complementary Metal Oxide Semiconductor (CMOS), instead of CCD. Note that the first imaging device 118a and the second imaging device 118b may use an imaging sensor of an optical reduction system type, instead of CIS.

A document placed on the document tray 103 is conveyed in the document conveyance direction A1 between the upper guide 108a and the lower guide 108b by the rotation of the feed roller 112 in a direction of arrow A2. The retard roller 113 rotates in a direction of arrow A3 when a document is being conveyed. By the movement of the feed roller 112 and the retard roller 113, when a plurality of documents is placed on the document tray 103, only a document being in contact with the feed roller 112 among the documents placed on the document tray 103 is separated. As such, the feed roller 112 and retard roller 113 function as a conveyance member that conveys a document, as well as, as a separating member that separates a document by limiting the conveyance of documents other than the separated document (multi feed prevention).

The document is fed between the first conveyance roller 115 and the first driven roller 116 through the guide of the upper guide 108a and lower guide 108b. The document is then fed between the first imaging device 118a and the second imaging device 118b by the rotation of the first conveyance roller 115 in a direction of arrow A4. The document read by the imaging device 118 is discharged on the discharging tray 105 by the rotation of the second conveyance roller 120 in a direction of arrow A5.

Figure 3:
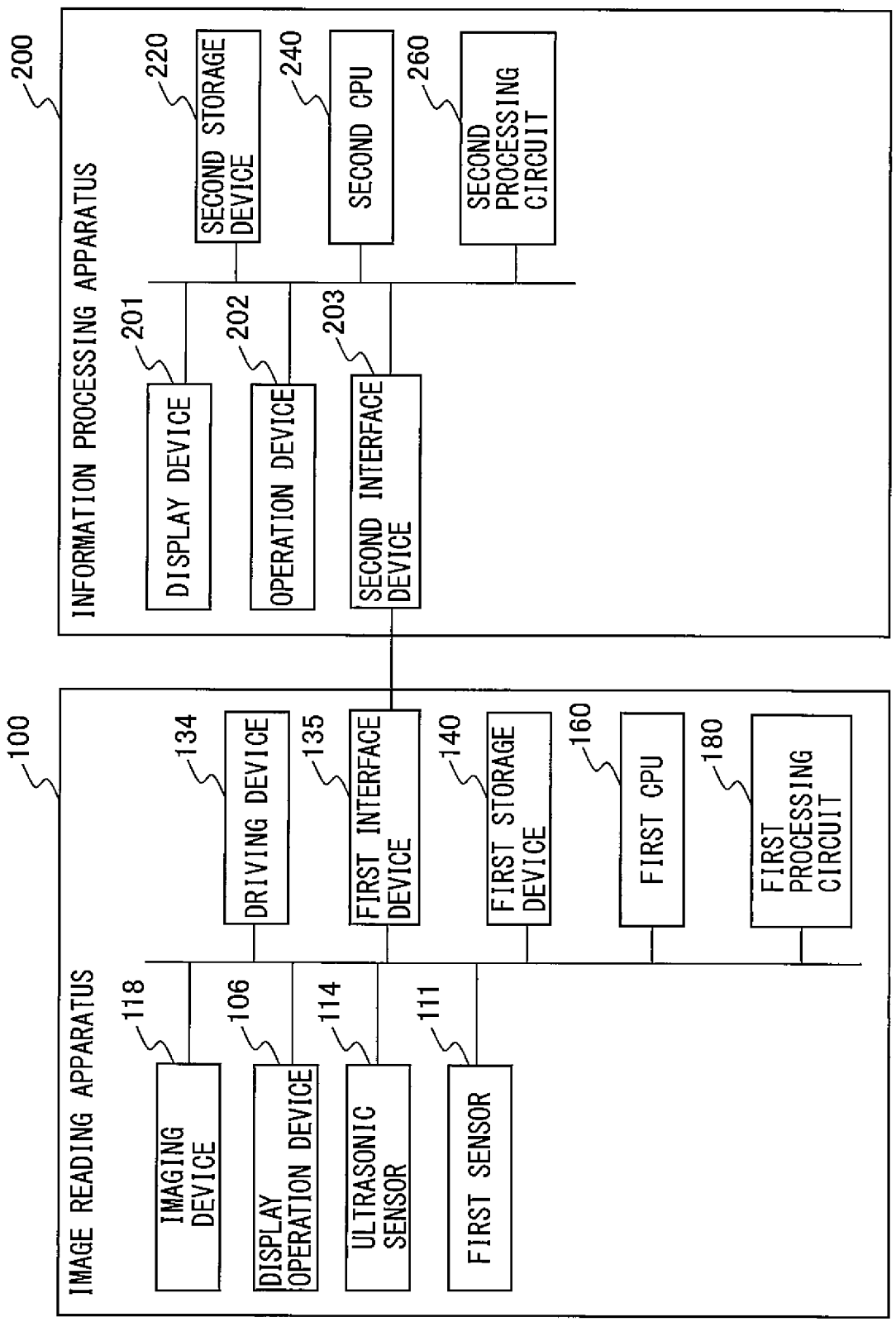
FIG. 3 is a block diagram depicting a schematic configuration of an image reading apparatus and an information processing apparatus.

FIG. 3 is a block diagram depicting schematic components of the image reading apparatus 100 and the information processing apparatus 200.

In addition to the above-described components, the image reading apparatus 100 further includes a driving device 134, a first interface device 135, a first storage device 140, a first Central Processing Unit (CPU) 160, a first processing circuit 180, etc.

The driving device 134 includes one or a plurality of motors and rotates the feed roller 112, the retard roller 113, the first conveyance roller 115, and the second conveyance roller 120 according to a control signal from the CPU 160 to convey a document.

The first interface device 135 has an interface circuit conforming to a serial bus such as Universal Serial Bus (USB). The first interface device 135 transmits and receives various images and information through a communication connection with the information processing apparatus 200. Instead of the first interface device 135, a communication device that has an antenna for transmitting and receiving wireless signals and a wireless communication interface circuit for transmitting and receiving signals via a wireless communication channel according to a predetermined communication protocol may be used. The predetermined communication protocol may be, for example, a wireless local area network (LAN).

The first storage device 140 includes: a memory device, such as a random access memory (RAM) and a read only memory (ROM); a fixed disk device, such as a hard disk; or a portable storage device, such as a flexible disk and an optical disk. The first storage device 140 stores a computer program, a database, a table, etc., that are used for various processing of the image reading apparatus 100. The computer program may be installed on the first storage device 140 from a computer-readable, non-transitory medium such as a compact disk read only memory (CD-ROM), a digital versatile disk read only memory (DVD-ROM), etc., by using a well-known setup program, etc.

The first CPU 160 operates according to a program stored in advance in the first storage device 140. Note that a digital signal processor (DSP), a large scale integration (LSI), etc., may be used instead of the first CPU 160. Alternatively, an Application Specific Integrated Circuit (ASIC), a field-programming gate array (FPGA) etc., may be used instead of the first CPU 160.

The first CPU 160 is connected to the display operation device 106, the first sensor 111, the ultrasonic sensor 114, the imaging device 118, the driving device 134, the first interface device 135, the first storage device 140, the first processing circuit 180, etc., and controls these components. The first CPU 160 controls driving of the driving device 134, document reading of the imaging device 118, etc.

The first processing circuit 180 performs predetermined image processing such as correction processing on the image acquired from the imaging device 118. Note that a LSI, a DSP, an ASIC, a FPGA, etc., may be used as the first processing circuit 180.

The information processing apparatus 200 further includes a display device 201, an operation device 202, a second interface device 203, a second storage device 220, a second CPU 240, a second processing circuit 260, etc.

The display device 201 has a display composed of liquid crystal, organic EL, etc., and an interface circuit for outputting image data on the display and displays image data on the display according to an instruction from the second CPU 240.

The operation device 202 includes an input device and an interface circuit that acquires signals from the input device, receives an operation by a user, and outputs signals according to the input by the user to the second CPU 240.

The second interface device 203 includes an interface circuit or a wireless communication interface circuit, similar to the one of the first interface device 135, and transmits and receives a variety of images and information through a communication connection with the image reading apparatus 100.

The second storage device 220 has: a memory device, such as a RAM and a ROM; a fixed disk device, such as a hard disk; or a portable storage device, such as a flexible disk and an optical disk. Further, the second storage device 220 stores a computer program, a database, a table, etc., that are used for various processing of the information processing apparatus 200. The computer program may be installed on the second storage device 220 from a computer-readable, non-transitory medium such as a CD-ROM, a DVD-ROM, etc., by using a well-known setup program, etc. The second storage device 220 further stores a variety of images, as data.

The second CPU 240 operates according to a program stored in advance in the second storage device 220. Note that a DSP, a LSI, an ASIC, a FPGA, etc., may be used instead of the second CPU 240.

The second CPU 240 is connected to the display device 201, the operation device 202, the second interface device 203, the second storage device 220, the second processing circuit 260, etc., and controls these components. The second CPU 240 controls the components and executes image processing on images acquired from the image reading apparatus 100.

The second processing circuit 260 performs predetermined image processing such as correction processing on an image acquired from the image reading apparatus 100. Note that a DSP, a LSI, an ASIC, a FPGA, etc., may be used as the second processing circuit 260.

Figure 4:
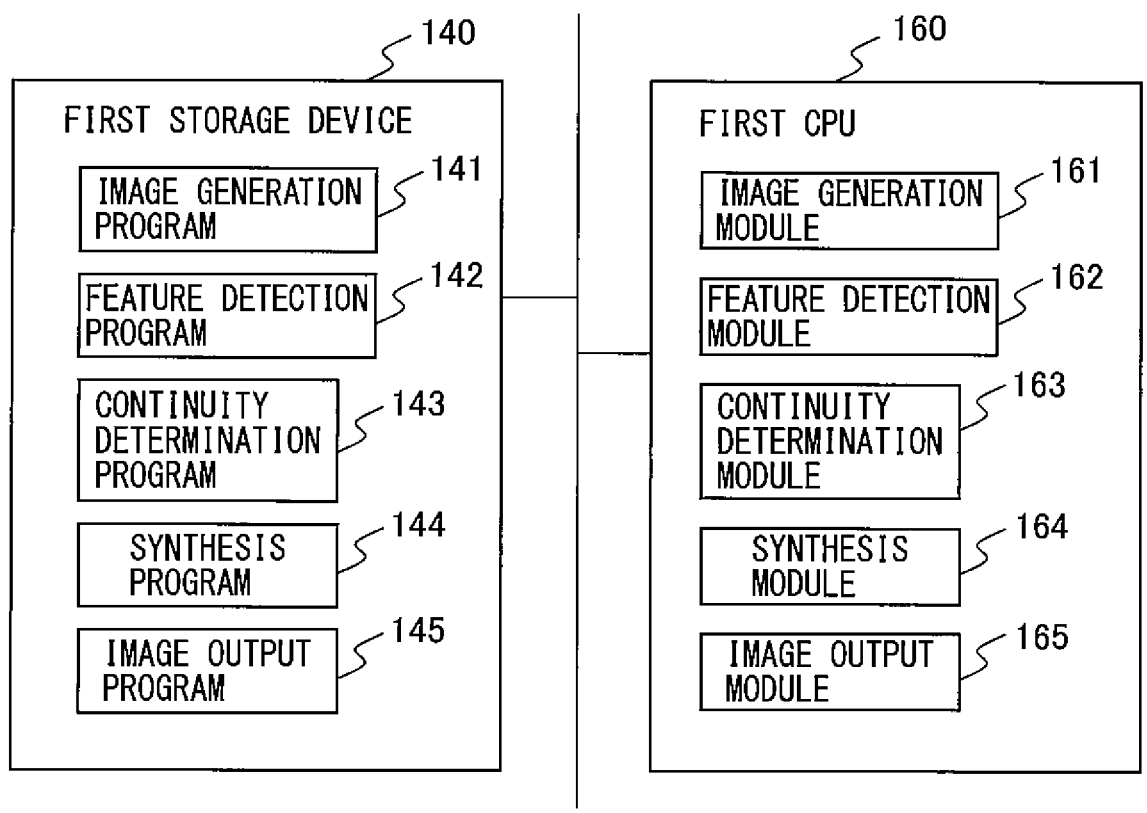
FIG. 4 is a view depicting a schematic configuration of a first storage device and a first CPU.

FIG. 4 is a view depicting the schematic components of the first storage device 140 and the first CPU 160 of the image reading apparatus 100.

As depicted in FIG. 4, the first storage device 140 stores programs such as an image generation program 141, a feature detection program 142, a continuity determination program 143, a synthesis program 144, and an image output program 145. Each of these programs is a functional module implemented by software that operates on the processor. The first CPU 160 reads the programs stored in the first storage device 140 and operates according to the read programs. As such, the first CPU 160 functions as an image generation module 161, a feature detection module 162, a continuity determination module 163, a synthesis module 164, and an image output module 165.

Figure 5:
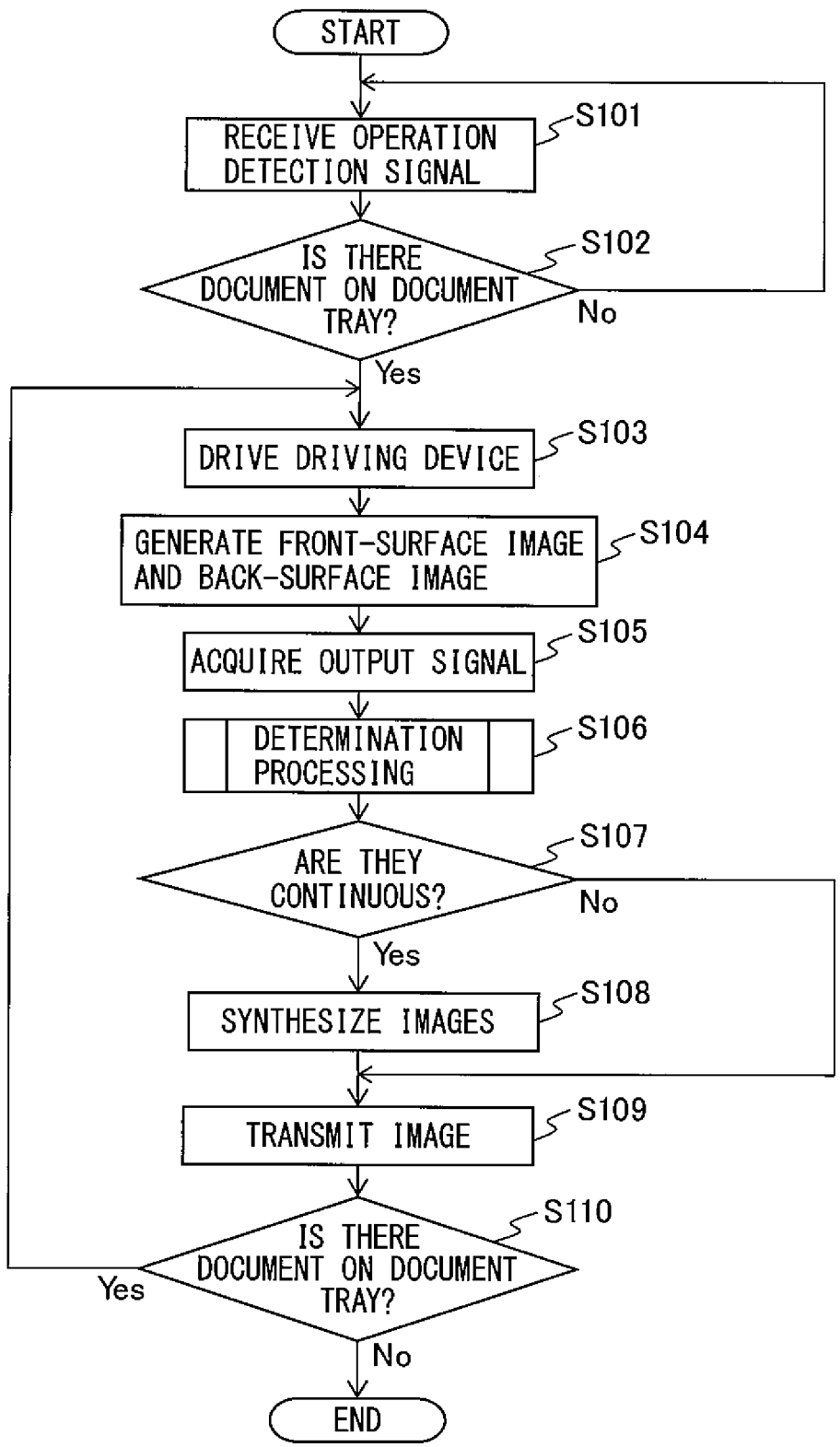
FIG. 5 is a flow chart depicting an example of an operation of the overall processing of the image reading apparatus.

FIG. 5 is a flowchart depicting an example of the operation of the overall processing of the image reading apparatus 100. The following will describe an example of the operation of the overall processing of the image reading apparatus 100 with reference to the flowchart depicted in FIG. 11. Note that the operation flow as will be described below is performed primarily by the first CPU 160 jointly with each component of the image reading apparatus 100 according to programs prestored in the first storage device 140. When the overall processing is executed, the function for separating the documents is suspended and the retard roller 113 rotates in accordance with the rotation of the feed roller 112.

First, the image generation module 161 stands by until the user executes, by using the display operation device 106, the operation of giving an instruction to the apparatus to read the document and until the image generation module 161 receives an operation signal corresponding to the operation from the display operation device 106 (step S101).

Next, the image generation module 161 determines whether a document is placed on the document tray 103 based on a first document detecting signal received from the first sensor 111 (step S102).

When a document is not placed on the document tray 103, the image generation module 161 returns the processing to step S101 and waits for newly receiving an operation signal.

Whereas, when a document is placed on the document tray 103, the first image generation module 161 drives the driving device 134 to rotate the feed roller 112, first conveyance roller 115 and second conveyance roller 120 to convey the document (step S103).

Next, the image generation module 161 causes the imaging device 118 to read the conveyed document and acquires the front-surface input image and the back-surface input image from the imaging device 118. The image generation module 161 generates a front-surface image captured of the front surface of the conveyed document from the front-surface input image and generates a back-surface image captured of the back surface of the conveyed document from the back-surface input image (step S104).

First, the image generation module 161 extracts edge pixels for each of the front-surface input image and the back-surface input image in each of the horizontal direction (main scanning direction) and the vertical direction (sub-scanning direction). The image generation module 161 generates an edge image consisting of the edge pixels for each of the input images in each of the horizontal direction and the vertical direction. The image generation module 161 calculates the absolute value of the difference between the luminance values of the pixels adjacent to each other in the horizontal direction in each of the input images (to be referred to as the adjacent difference value hereinafter) and, when the adjacent difference value is greater than a threshold value Th1, extracts the pixels of the input image as vertical edge pixels. The threshold value Th1 can be set, for example, at such a difference between the luminance values (e.g., 20) that a human eye can discriminate the difference of the luminance on the image. The image generation module 161 executes similar processing on each of the input image also in the vertical direction and extracts horizontal edge pixels.

Note that the image generation module 161 may calculate the absolute value of the difference between the luminance values of the pixels apart from each other at a predefined distance in each of the horizontal direction and the vertical direction in each of the input images as the adjacent difference value. Further, the image generation module 161 may use the color values (R values, G values, or B values) of the pixels instead of the luminance values in calculating the adjacent difference value. Further, the image generation module 161 may extract edge pixels by comparing the luminance values or the color values of the input images with a threshold value. For example, the image generation module 161 extracts a certain pixel as an edge pixel when the luminance value or the color value of the certain pixel is smaller than the threshold value and the luminance value or the color value of a pixel adjacent to the certain pixel or of a pixel apart from the certain pixel by a predefined distance is equal to or greater than the threshold value.

Next, the image generation module 161 detects a plurality of straight lines from the extracted edge pixels. The image generation module 161 extracts a plurality of straight lines from the respective edge images in the horizontal direction and the vertical direction. The image generation module 161 detects straight lines using Hough transform. Note that the image generation module 161 may detect straight lines using a least squares method.

Next, the image generation module 161 detects a rectangle from the detected plurality of straight lines. The image generation module 161 extracts a plurality of rectangle candidates, each constituted by four straight lines where each two of the detected plurality of straight lines are substantially perpendicular to each other. The image generation module 161 first selects one straight line in a horizontal direction (hereinafter, referred to as the first horizontal line) and extracts another straight line in a horizontal direction that is substantially parallel (for example, ±3° or less) to the selected straight line and apart from the selected straight line by threshold Th1 or more (hereinafter, referred to as the second horizontal line). Next, the image generation module 161 extracts a straight line in a vertical direction substantially perpendicular to the first horizontal line (for example, +3° or less with respect to 90°) (hereinafter, referred to as the first vertical line). Next, the image generation module 161 extracts a straight line in a vertical direction that is substantially perpendicular to the first horizontal line and apart from the first vertical line by a threshold Th2 or more (hereinafter, referred to as the second vertical line). Note that the thresholds Th1 and Th2 may be predefined according to the size of a document to be read by the image reading apparatus 100 and may be the same values.

The image generation module 161 extracts all combinations of a first horizontal line, a second horizontal line, a first vertical line, and a second vertical line that satisfy the above conditions from among all the extracted straight lines and extracts rectangles constituted by the extracted combinations as rectangle candidates. The image generation module 161 calculates the areas of the extracted rectangle candidates and eliminates the rectangle candidates of which area is less than a predetermined value. The image generation module 161 detects a rectangle candidate with the largest area from the remaining rectangle candidates as a document region. Whereas, when there is no remaining rectangle candidate, the image generation module 161 detects no document region. The image generation module 161 generates a front-surface image by cutting out a rectangle detected from the front-surface input image and generates a back-surface image by cutting out a rectangle detected from the back-surface input image.

Next, the feature detection module 162 acquires an output signal outputted by the ultrasonic sensor 114 while the document is conveyed (step S105).

Next, the feature detection module 162 and the continuity determination module 163 execute determination processing (step S106). In the determination processing, the feature detection module 162 detects a feature of the conveyed document. Further, in the determination processing, the continuity determination module 163 determines whether a first end of the front-surface image and a second end of the back-surface image are continuous or not, the first end being any of the ends of the front-surface image, the second end being an end corresponding to the first end, based on the front-surface image and the back-surface image and the feature detected by the feature detection module 162. Details of the determination processing will be described later.

Next, the synthesis module 164 determines whether or not the continuity determination module 163 has determined that the first end and the second end are continuous in the determination processing (step S107).

When the continuity determination module 163 has determined that the first end and the second end are continuous, the synthesis module 164 synthesizes the front-surface image and the back-surface image and generates a synthesized image (step S108). The synthesis module 164 generates the synthesized image in such a manner that the pixels on the first end of the front-surface image and the second end of the back-surface image that correspond to each other are placed adjacently to each other. When the continuity determination module 163 has determined that the first end and the second end are not continuous, the synthesis module 164 does not synthesize the front-surface image and the back-surface image.

Next, the image output module 165 outputs the synthesized image or the front-surface image and the back-surface image to the information processing apparatus 200 via the first interface device 135 (step S109). When the synthesis module 164 has generated a synthesized image, the image output module 165 outputs the synthesized image to the information processing apparatus 200 and when the synthesis module 164 has not generated a synthesized image, the image output module 165 outputs the front-surface image and the back-surface image to the information processing apparatus 200. The information processing apparatus 200 acquires the synthesized image or the front-surface image and the back-surface image via the second interface device 203 and displays the acquired image on the display device 201.

Next, the image generation module 161 determines whether or not there is a document remaining in the document tray 103, based on the first document detection signal received from the first sensor 111 (step S110).

When there is a document remaining in the document tray 103, the image generation module 161 returns the processing to step S103 and repeats the processing of steps S103 to S110. When there is no document remaining in the document tray 103, the image generation module 161 ends the series of processes.

Figure 6:
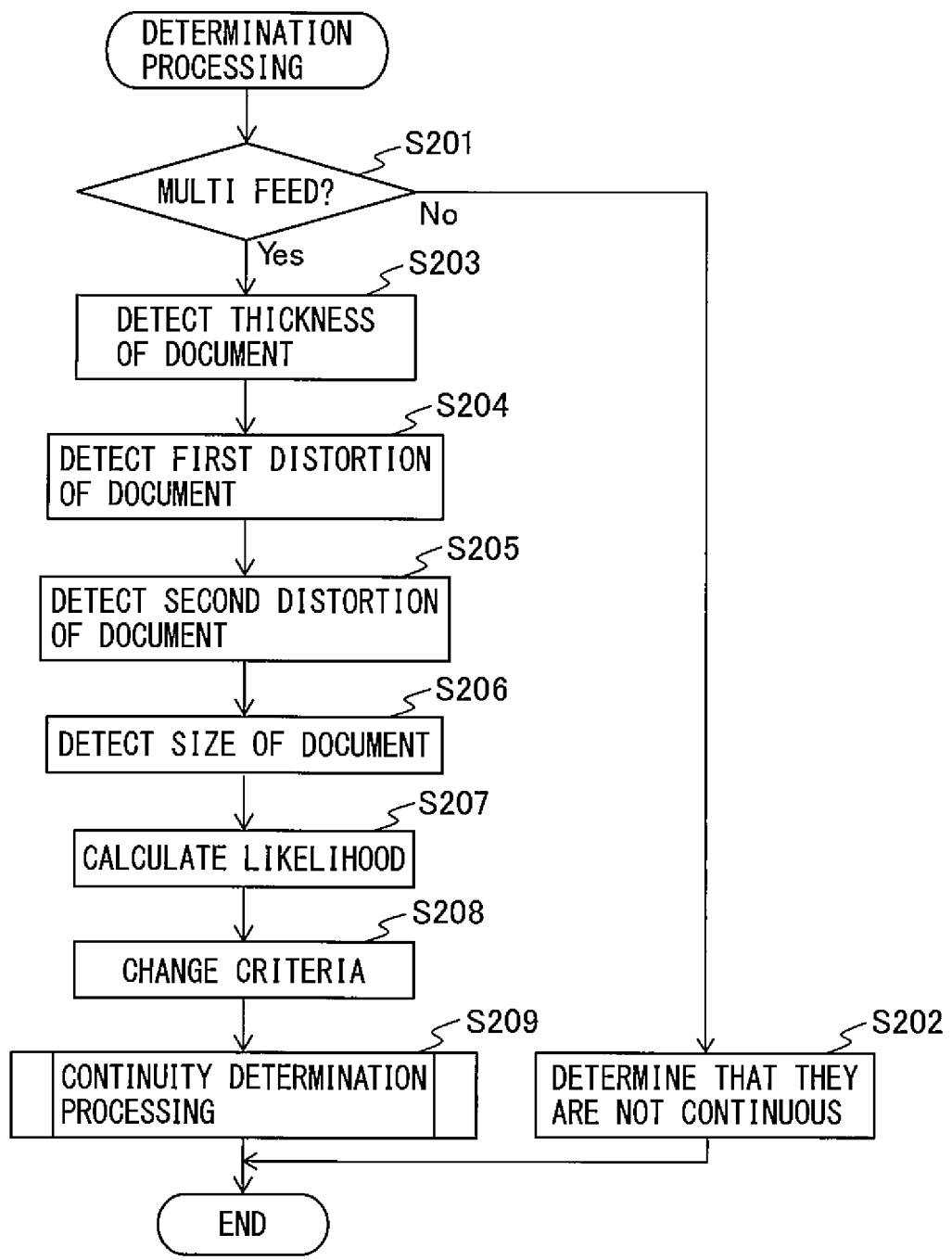
FIG. 6 is a flow chart depicting an example of an operation of determination processing.

FIG. 6 is a flow chart depicting an example of an operation of determination processing. The determination processing depicted in FIG. 6 is executed in step S106 of the flow chart depicted in FIG. 5.

First, the feature detection module 162 detects, as a feature of the conveyed document, whether or not a multi-feed of the document has occurred, based on the output signal acquired from the ultrasonic sensor 114 (step S201).

Figure 7:
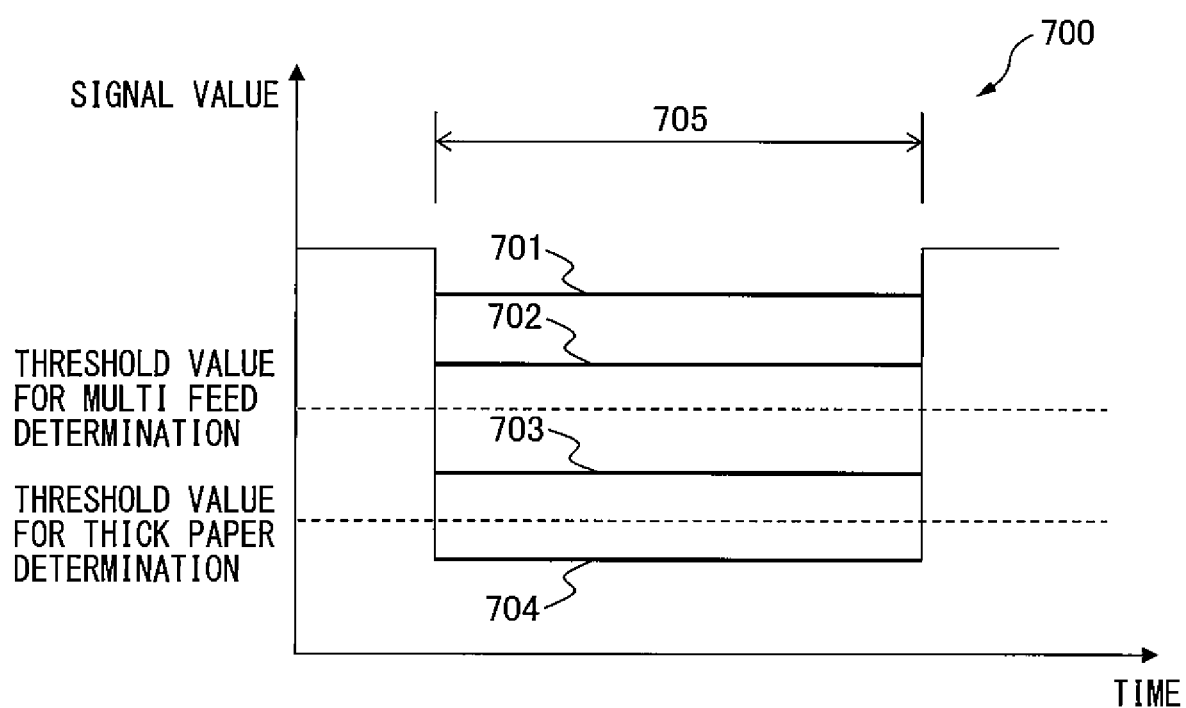
FIG. 7 is a view for illustrating output signal characteristics.

FIG. 7 is a view for illustrating output signal characteristics.

In the graph 700 in FIG. 7, the solid line 701 depicts an output signal characteristic in the case in which a single-sheet plain paper copier (PPC) document is conveyed, and the solid line 702 depicts an output signal characteristic in the case in which a single-sheet thick paper document is conveyed. The solid line 703 depicts an output signal characteristic in the case in which a multiple-sheet PPC document is conveyed, and the solid line 704 depicts an output signal characteristic in the case in which a multiple-sheet thick paper document is conveyed. The horizontal axis of the graph 700 indicates time and the vertical axis indicates signal values of the output signals. As depicted in graph 700, in the duration 705 during which the document passes between the ultrasonic sensor 114, ultrasonic waves outputted by the ultrasonic transmitter 114a attenuate when passing through the document and hence the output signal attenuates. In particular, the attenuation of the output signal in a case in which the ultrasonic waves outputted by the ultrasonic transmitter 114a pass through a multiple-sheet document is greater than the one in a case in which the ultrasonic waves pass through a single sheet document. It is therefore possible to determine whether or not a multiple-sheet document is being conveyed, based on whether or not the signal value of the output signal is smaller than a threshold value for multifeed determination.

The feature detection module 162 determines whether or not a multifeed of a document has occurred by determining whether or not the signal value of the output signal acquired when the document is passing the ultrasonic sensor 114 is smaller than a predefined threshold value for multifeed determination. The feature detection module 162 determines that a multifeed of a document has occurred when the minimum value of the signal value of the output signal is smaller than the threshold value for multifeed determination and the signal value of the output signal is smaller than the threshold value for multifeed determination for a predefined duration or longer. In particular, the feature detection module 162 determines that a multiple-sheet document of different sizes or a multiple-sheet document not lined up is being conveyed when the difference between the maximum value and the minimum value of the signal value of the output signal is equal to or greater than a predefined value. The feature detection module 162 determines that a multiple-sheet document of the same size is lined up and being conveyed when the difference between the maximum value and the minimum value of the output signal is smaller than the predefined value.

Further, the feature detection module 162 determines that no multifeed of a document has occurred when the minimum value of the signal value of the output signal is equal to or greater than the threshold value for multifeed determination or the minimum value of the signal value of the output signal is smaller than the threshold value for multifeed determination for a duration shorter than a predefined duration. In particular, the feature detection module 162 determines that a document with a sticker or a photograph attached thereto is being conveyed when the minimum value of the signal value of the output signal is smaller than the threshold value for multifeed determination and the minimum value of the signal value of the output signal is smaller than the threshold value for multifeed determination for a duration shorter than a predefined duration.

When the feature detection module 162 has determined that no multifeed of a document has occurred, the continuity determination module 163 determines that the conveyed document consists of a single sheet and that the first end of the front-surface image and the second end of the back-surface image are not continuous (step S202) and ends the series of steps.

When the feature detection module 162 has determined that a multifeed of a document has occurred, the feature detection module 162 detects the thickness of the conveyed document as a feature of the conveyed document, based on the output signal acquired from the ultrasonic sensor 114 (step S203).

As depicted in the graph 700 in FIG. 7, the attenuation of the output signal in the duration 705 in a case in which the ultrasonic waves outputted by the ultrasonic transmitter 114a pass through a thick paper document is greater than the attenuation of the output signal in a case in which the ultrasonic waves pass through a PPC document. It is possible therefore to determine whether or not the conveyed document is a thick sheet of paper, based on whether or not the signal value of the output signal is smaller than a threshold value for thick paper determination.

The feature detection module 162 determines whether or not the conveyed document is a thick sheet of paper, based on whether or not the acquired signal value of the output signal is smaller than a predefined threshold value for thick paper determination. The image reading apparatus 100 may store a plurality of ranges of signal values, each range associated with a thickness of the document, in the first storage device 140 in advance. In such a case, the feature detection module 162 identifies the range that includes the acquired signal value of the output signal among the ranges stored in the first storage device 140 and detects the thickness associated with the identified range as the thickness of the conveyed document.

Next, the feature detection module 162 detects, as a feature of the conveyed document, whether or not a first distortion has occurred in the external shape of the document depicted in the front-surface image or the back-surface image generated by the image generation module 161 (step S204). The first distortion is a misalignment of sides of a folded document.

Figure 8A:
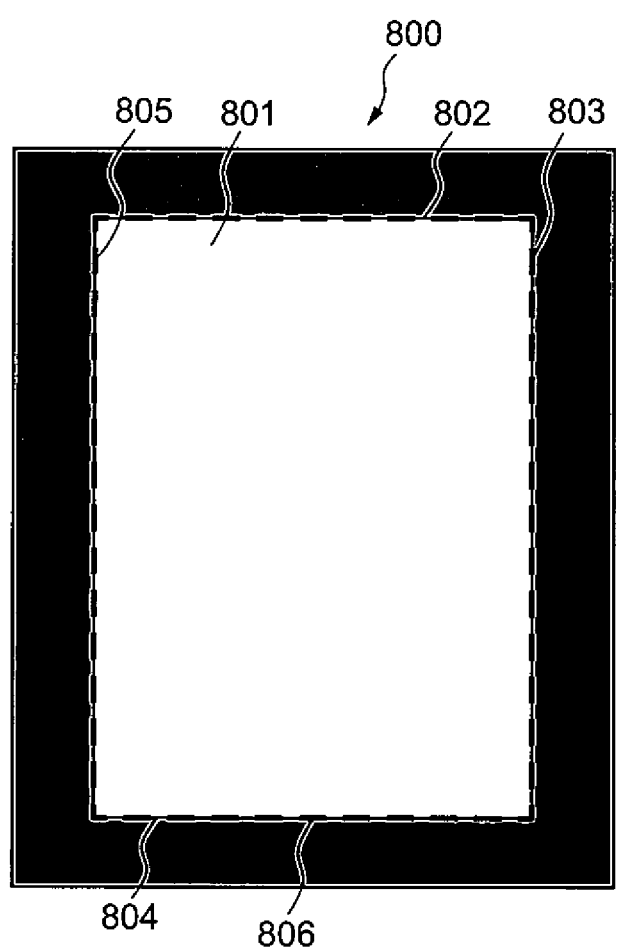
FIG. 8A is a view for illustrating a misalignment of sides of a folded document.
Figure 8B:
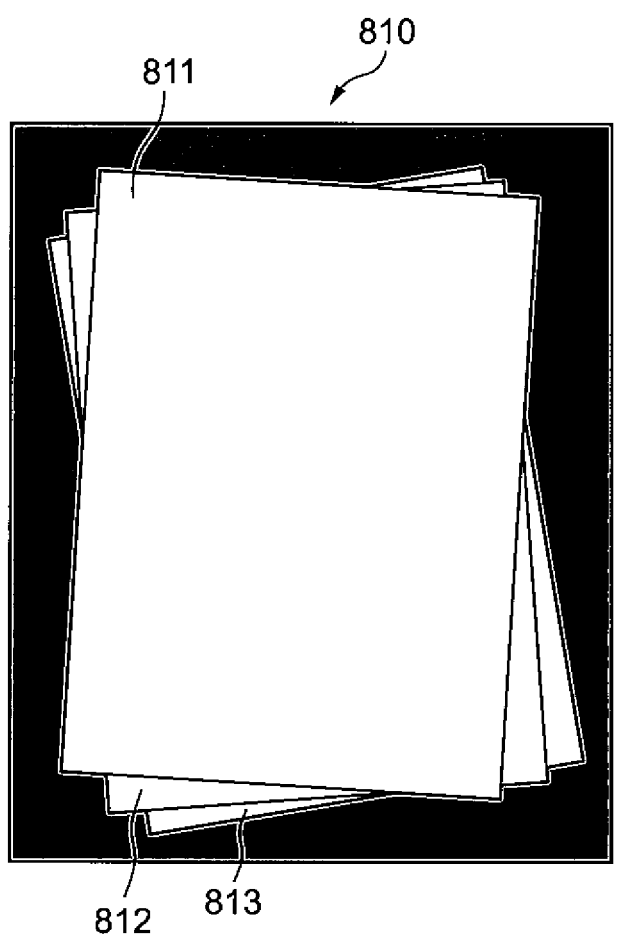
FIG. 8B is a view for illustrating a misalignment of sides of a folded document.
Figure 8C:
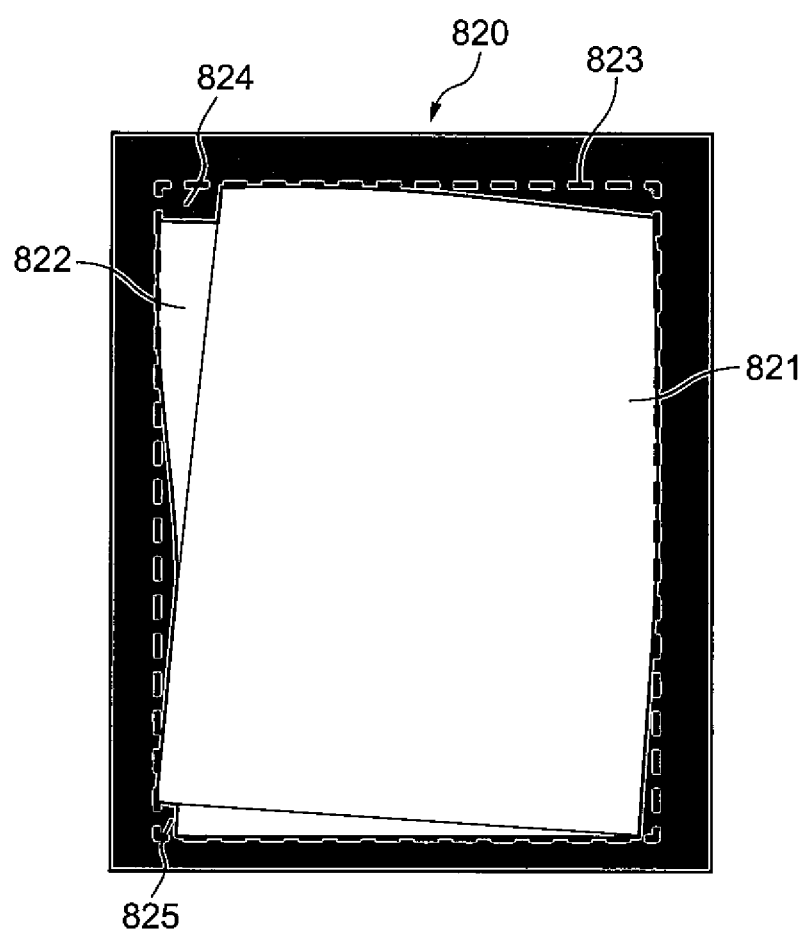
FIG. 8C is a view for illustrating a misalignment of sides of a folded document.

FIGS. 8A to 8C are views for illustrating a misalignment of sides of a folded document.

The image 800 depicted in FIG. 8A is an image captured of a conveyed document consisting of a single sheet. As depicted in 8A, when a single sheet document is conveyed, straight lines 802 to 805 are correctly detected from the image 800 captured of the conveyed document 801 and a rectangle 806 is correctly detected from the straight lines 802 to 805.

The image 810 depicted in FIG. 8B is an image of a document consisting of multiple sheets conveyed together. As depicted in FIG. 8B, when a document consisting of multiple sheets is conveyed together, various straight lines are detected from the multiple sheets 811 to 813 of the conveyed document and it is likely that no rectangle is detected. Further, the sheets of the document are likely to be conveyed in various directions and in various timings and, even when a rectangle is detected, how the sheets of the document and the background are depicted in the rectangle may vary greatly, depending on the direction and timing in which the document is conveyed.

The image 820 depicted in FIG. 8C is an image captured of a document folded in two. As depicted in FIG. 8C, when the document is folded in two, a half 821 and the other half 822 of the document folded in two may be out of alignment to each other when they are conveyed, resulting in a misalignment of sides of the half 821 and the other half 822 of the document. In such a case, the rectangle 823 in the image 820, detected based on the half 821 and the other half 822 of the document, may include not only the half 821 and the other half 822 of the document but also parts of the background (the backing of the document) 824, 825 due to the misalignment of the sides of the folded document.

Among candidate rectangles extracted by the image generation module 161, the feature detection module 162 detects a candidate rectangle that includes any one of the upper right end, the lower right end, the upper left end, and the lower left end of the front-surface image (or the back-surface image) and has an area equal to or smaller than a predefined range, and treats the detected rectangle as a background captured due to a misalignment of sides of the folded document. The range is predefined by experiments conducted in advance. When the feature detection module 162 has detected a background captured due to a misalignment of sides of the folded document at the upper left end and the lower left end of the front-surface image (or the back-surface image) and has detected no background captured due to a misalignment of sides of the folded document at the upper right end and the lower right end of the same image, the feature detection module 162 determines that a misalignment of sides of the folded document has occurred on the left end side of the image. In such a case, the feature detection module 162 determines that the crease of the document is on the right end side of the image. When the feature detection module 162 has detected a background captured due to a misalignment of sides of the folded document at the upper right end and the lower right end of the front-surface image (or the back-surface image) and has detected no background captured due to a misalignment of sides of the folded document at the upper left end and the lower left end of the same image, the feature detection module 162 determines that a misalignment of sides of the folded document has occurred on the right end side of the image. In such a case, the feature detection module 162 determines that the crease of the document is on the left end side of the image. In the other cases, the feature detection module 162 determines that no misalignment of sides of the folded document has occurred in the external shape of the document.

Note that the feature detection module 162 may determine whether or not a misalignment of sides of the folded document has occurred in the external shape of the document by using a discriminator that has learned in advance to output a degree to which the document depicted in the image has a misalignment of sides of the folded document. This discriminator performs learning in advance, for example, by deep learning, based on a plurality of images captured of documents not folded in two and a plurality of images captured of documents folded in two and is stored in the first storage device 140 in advance. This discriminator performs learning in advance to make a first output at a greater value as a misalignment of sides of the folded document is more likely to have happened on the right end side of the inputted image and to make a second output at a greater value as a misalignment of sides of the folded document is more likely to have happened on the right end side of the inputted image. The feature detection module 162 inputs the front-surface image (or the back-surface image) to the discriminator and determines whether or not a misalignment of sides of the folded document has occurred in the external shape of the document, based on whether or not the output values outputted by the discriminator are equal to or greater than predefined values.

Next, the feature detection module 162 detects, as a feature of the conveyed document, whether or not a second distortion has occurred in the external shape of the document depicted in the front-surface image or the back-surface image generated by the image generation module 161 (step S205). The second distortion is a tilt of the document due to cumulative skew.

Cumulative skew is a phenomenon that a document becomes tilted to a certain direction during conveyance due to the fact that the feed roller 112a and the retard roller 113a apply forces (loads) different from the ones that the feed roller 112b and the retard roller 113b apply to the document during conveyance. The feed roller 112a and the retard roller 113a are disposed on one side and the feed roller 112b and the retard roller 113b are disposed on the opposite side of the central portion of the conveyance path inside the image reading apparatus 100, in the direction (main scanning direction) perpendicular to the document conveyance direction A1. When a document folded in two is conveyed, the creased portion swells and the part of the document on the crease side becomes thicker than the part on the other side. Hence the feed roller 112a and the retard roller 113a apply forces (loads) different from the ones that the feed roller 112b and the retard roller 113b apply to the document during the conveyance and the document becomes tilted to the crease side during conveyance.

Figure 9:
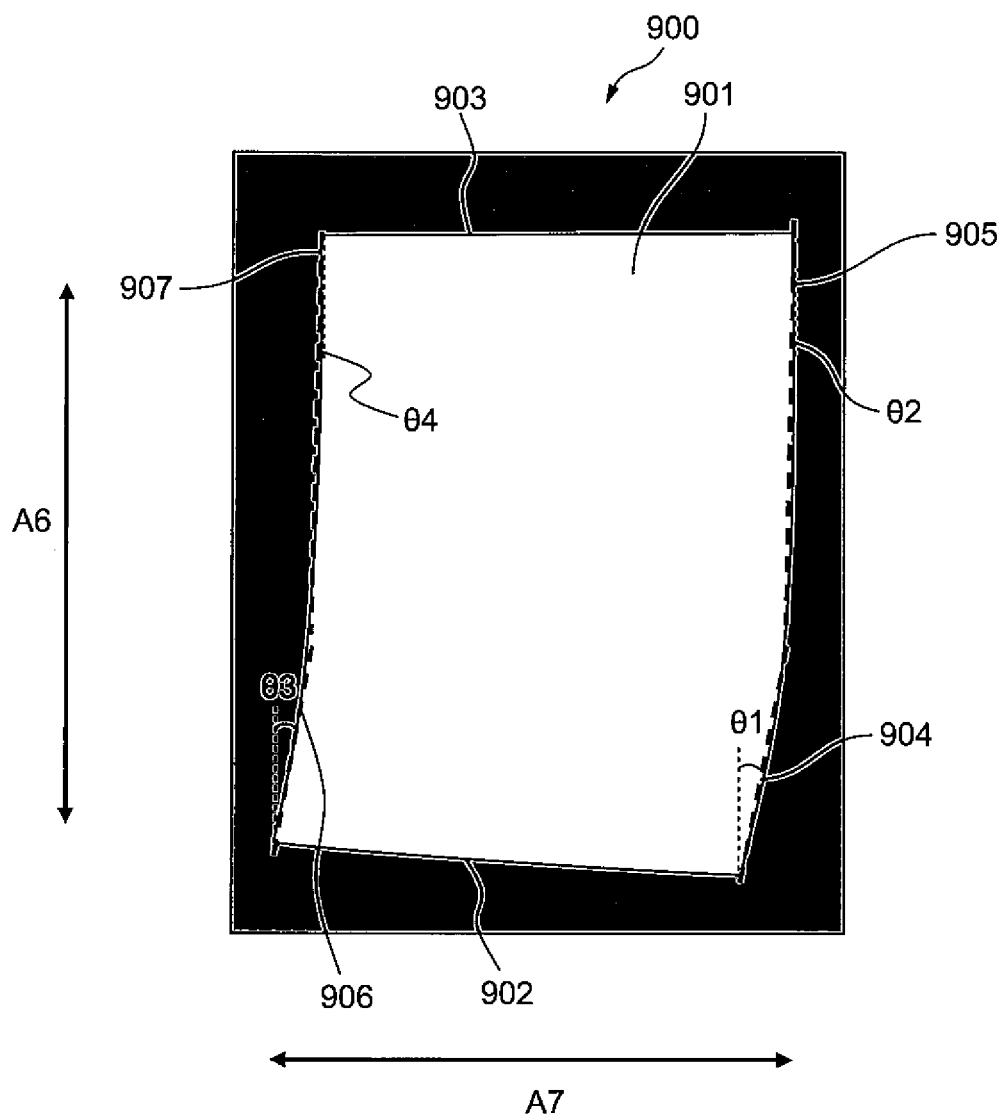
FIG. 9 is a view for illustrating a tilt of a document due to cumulative skew.

FIG. 9 is a view for illustrating a tilt of a document due to cumulative skew.

FIG. 9 depicts an image 900, which is an image captured of a document tilted during conveyance due to cumulative skew. As depicted in FIG. 9, when a document is tilted during conveyance due to cumulative skew, a document 901 is captured to be an image having a gradual tilt to a side, with the part closer to the rear end side 902 more tilted than the part closer to the front end side 903. As such, on the right end of the document 901, the angle $\theta 1$ formed by the straight line 904 detected on the rear end side 902 and the vertical direction A6 is greater than the angle $\theta 2$ formed by the straight line 905 detected on the front end side 903 and the vertical direction A6. Similarly, on the left end of the document 901, the angle $\theta 3$ formed by the straight line 906 detected on the rear end side 902 and the vertical direction A6 is greater than the angle $\theta 4$ formed by the straight line 907 detected on the front end side 903 and the vertical direction A6.

In contrast, when a single sheet document is conveyed, no cumulative skew occurs even when the document is tilted during conveyance, and the document is constantly tilted to a fixed direction during the conveyance. Hence the rectangle detected on the image is tilted as a whole and the angles formed by the straight lines included in the rectangle and the vertical direction do not vary. Further, when a multiple-sheet document is conveyed together, it is likely, as described above, that various straight lines are detected from the multiple-sheet document and that no rectangle is detected. Further, no cumulative skew occurs when a multiple-sheet document is conveyed and hence, even when a rectangle is detected, the rectangle is tilted as a whole and the angles formed by the straight lines included in the rectangle and the vertical direction do not vary.

The feature detection module 162 extracts two straight lines outermost in the horizontal direction A7 and uppermost in the vertical direction A6 among the straight lines detected from the vertical edge pixels by the image generation module 161. The feature detection module 162 calculates the angles $\theta 1$, $\theta 3$ formed by the extracted straight lines and the vertical direction A6 and calculates the average value of the angles. The feature detection module 162 also extracts two straight lines outermost in the horizontal direction A7 and lowermost in the vertical direction A6 among the straight lines detected from the vertical edge pixels by the image generation module 161. The feature detection module 162 calculates the angles $\theta 2$, $\theta 4$ formed by the extracted straight lines and the vertical direction A6 and calculates the average value of the angles. The feature detection module 162 determines that a tilt has occurred to the document due to cumulative skew when the difference between the average value of the angles $\theta 1$, $\theta 3$ and the average value of the angles $\theta 2$, $\theta 4$ is equal to or greater than a predefined value and the feature detection module 162 determines that no tilt has occurred to the document due to cumulative skew when the difference is smaller than the predefined value. When the feature detection module 162 has determined that a tilt has occurred to the document due to cumulative skew, the feature detection module 162 determines that there is a crease on the opposite side of the document to the direction in which the document is tilted on its lower end in the image.

Next, the feature detection module 162 detects, as a feature of the conveyed document, the size of the front-surface image or the back-surface image generated by the image generation module 161 (step S206). The feature detection module 162 calculates the area (number of pixels) of the front-surface image or the back-surface image as the size thereof.

Next, the continuity determination module 163 calculates the likelihood (probability) of the front-surface image and the back-surface image being continuous, based on the features detected by the feature detection module 162 (step S207). Note that the continuity determination module 163 may calculate the likelihood of each of the four ends of the front-surface image (or the back-surface image) being continuous.

When it has been determined in step S201 that a document consisting of lined up multiple sheets of the same size is conveyed, it is more likely that a document folded in two is being conveyed than when it has been determined that a document consisting of multiple sheets of different sizes or a document consisting of multiple sheets not lined up is being conveyed. The continuity determination module 163 calculates the likelihood in such a manner that the likelihood is higher when it has been determined that a document consisting of lined up multiple sheets of the same size is being conveyed than when it has been determined that a document consisting of multiple sheets of different sizes or a document consisting of multiple sheets not lined up is being conveyed. Note that the continuity determination module 163 may choose not to determine that the images are not continuous when it has been determined that no multifeed of a document has occurred. In this case, the continuity determination module 163 calculates the likelihood in such a manner that the likelihood will be even lower when it has been determined that no multifeed of a document has occurred than when it has been determined that a document consisting of multiple sheets of different sizes or a document consisting of multiple sheets not lined up is being conveyed.

Further, since it is difficult to fold a thick sheet of paper, it is less likely that a document folded in two is being conveyed when it has been determined in step S203 that a thick sheet of paper is being conveyed. Therefore, the continuity determination module 163 calculates the likelihood in such a manner that the likelihood is higher when the document is thinner according to the detection in step S203.

Further, it is more likely that a document folded in two is being conveyed when a misalignment of sides of the document is detected in step S204. Therefore, the continuity determination module 163 calculates the likelihood in such a manner that the likelihood is higher when a misalignment of sides of the document is detected than when no misalignment of sides of the document is detected. Further, when a misalignment of sides of the document is detected, the continuity determination module 163 may calculate the likelihood in such a manner that the likelihood at the end that has been determined to be on the crease side is higher than that at the other end.

Further, it is more likely that a document folded in two is being conveyed when a tilt of the document due to cumulative skew has been detected in step S205. Therefore, the continuity determination module 163 calculates the likelihood in such a manner that the likelihood is higher when a tilt of the document due to cumulative skew has been detected than when no tilt of the document due to cumulative skew has been detected. Further, when a tilt of the document due to cumulative skew has been detected, the continuity determination module 163 may calculate the likelihood in such a manner that the likelihood at the end that has been determined to be on the crease side is higher than that at the other end.

Further, a document in a size that can be conveyed in the image reading apparatus 100 is less likely to be folded in two when conveyed. Therefore, it is less likely that a document folded in two is being conveyed when the size of the image detected in step S206 is equal to or less than 50% of the conveyable size of the image reading apparatus 100. Therefore, the continuity determination module 163 calculates the likelihood in such a manner that the likelihood is higher when the size of the image detected in step S206 is more than 50% of the conveyable size of the image reading apparatus 100 than when the size of the image is equal to or less than 50%.

Note that the feature detection module 162 may calculate the likelihood based on at least one of the detected features and may calculate the likelihood based on any combination of the detected features.

Next, the continuity determination module 163 changes the predefined criteria to be used for determining whether or not the first end of the front-surface image and the second end of the back-surface image are continuous, based on the likelihood calculated by the feature detection module 162 (step S208). Details for the predefined criteria will be described later.

Next, the continuity determination module 163 executes continuity determination processing (step S209) and ends the series of processes. In the continuity determination processing, the continuity determination module 163 determines whether or not the first end of the front-surface image and the second end of the back-surface image are continuous, based on the front-surface image and the back-surface image and the features detected by the feature detection module 162. In particular, the continuity determination module 163 determines whether or not the first end of the front-surface image and the second end of the back-surface image are continuous according to the criteria changed in step S208. Details for the continuity determination processing will be described later.

Figure 10:
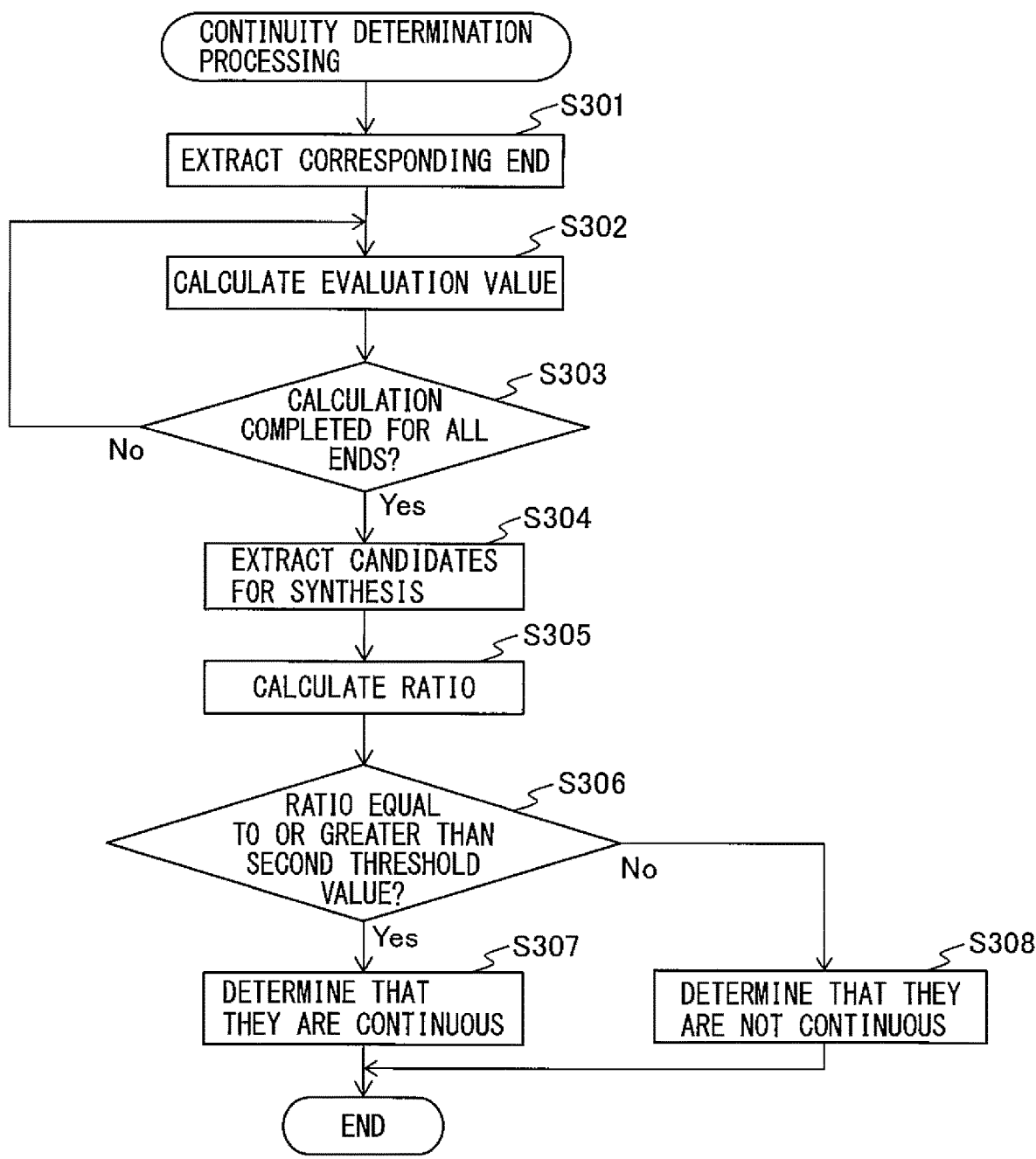
FIG. 10 is a flow chart depicting an example of an operation of continuity determination processing.

FIG. 10 is a flow chart depicting an example of an operation of continuity determination processing. The continuity determination processing depicted in 10 is executed in step S209 of the flow chart depicted in FIG. 6.

First, the continuity determination module 163 extracts the ends of the back-surface image that respectively correspond to (may be continuous with) the four ends of the front-surface image (step S301). The continuity determination module 163 extracts the left side, the right side, the upper side, and the lower side of the back-surface image as the ends of the back-surface image respectively corresponding to the right side, the left side, the upper side, and the lower side of the front-surface image.

Next, the continuity determination module 163 calculates the evaluation value for each of the four ends of the front-surface image, the evaluation values respectively indicating the degrees to which the ends and the ends of the back-surface image respectively corresponding to the ends are continuous (step S302). First, the continuity determination module 163 calculates the average value of the gradient values of the pixels positioned within a predefined range from particular pixels included in a particular end of the front-surface image. Next, the continuity determination module 163 calculates the average value of the gradient values of the pixels positioned at the end of the back-surface image corresponding to the particular end within a predefined range from the positions respectively corresponding to the particular pixels (the positions adjacent to the particular pixels when the two ends adjoin each other).

The continuity determination module 163 calculates the average value of the gradient values for each of the RGB colors and calculates the respective difference values between the average values of the gradient values calculated for the particular end of the front-surface image and the average values of the gradient values calculated for the corresponding end of the back-surface image. The continuity determination module 163 calculates the difference value for each of the RGB colors with respect to all pixels contained in the particular end of the front-surface image and calculates, as the evaluation value of the particular end, the number of pixels of which the average value (or the maximum value) of the difference values calculated for the RGB colors is equal to or smaller than the first threshold value.

Next, the continuity determination module 163 determines whether or not the continuity determination module 163 has determined evaluation values for all four ends of the front-surface image (step S303).

When there is an end for which no evaluation value has yet been calculated, the continuity determination module 163 returns the process to step S302 and calculates the evaluation value for the end for which no evaluation value has been calculated. When evaluation values have been calculated for all front-surface images, the continuity determination module 163 extracts the end of the front-surface image having the highest evaluation value and the end of the back-surface image corresponding to that end (step S304) as candidate ends for synthesis.

Next, the continuity determination module 163 calculates the ratio of the evaluation value of the candidate end for synthesis to the sum of the evaluation values of the four ends of the front-surface image (step S305).

Next, the continuity determination module 163 determines whether or not the calculated ratio is equal to or greater than a second threshold value (step S306).

When the calculated ratio is equal to or greater than the second threshold value, the continuity determination module 163 determines that the candidate end for synthesis of the front-surface image and the candidate end for synthesis of the back-surface image are continuous (step S307) and ends the series of steps.

When the calculated ratio is smaller than the second threshold value, the continuity determination module 163 determines that the end of the front-surface image and the end of the back-surface image are not continuous (step S308) and ends the series of steps.

Thus, the continuity determination module 163 compares the second threshold value with the ratio of the evaluation value of the first end to the sum of the evaluation values of the four ends of the front-surface image and, based on the result of the comparison, determines whether or not the first end and the second end are continuous. The continuity determination module 163 determines whether or not the ends are continuous, based not only on an absolute evaluation of the ends but also on a relative evaluation in comparison with all ends, in other words, based on the deviation of the evaluation of each end and therefore the determination accuracy is improved.

Further, the continuity determination module 163 compares the average value of the gradient values of the pixels positioned within a predefined range from the pixels corresponding to the first end and the average value of the gradient values of the pixels positioned within a predefined range from the pixels corresponding to the second end and, based on the result of the comparison, determines whether or not the first end and the second end are continuous. In particular, the continuity determination module 163 compares the first threshold value with the difference value of the average values relating to the first end and the average values relating to the second end and, based on the result of the comparison, determines whether or not the first end and the second end are continuous. The continuity determination module 163 determines whether or not the ends are continuous, based on the continuity of hue and therefore the determination accuracy is improved.

The predefined range, the first threshold value, and/or the second threshold value used in the continuity determination processing are examples of predefined criteria and are predefined and changed in step S208 in FIG. 6.

For example, the minimum range of the predefined range is set at the range equal to or less than one pixel in the horizontal and vertical directions and the maximum range of the predefined range is set at the range equal to or fewer than five pixels in the horizontal and vertical directions. The continuity determination module 163 changes the predefined range in such a manner as to widen the range as the likelihood calculated by the feature detection module 162 is higher, to make it easier to determine that the front-surface image and the back-surface image are continuous. Further, when the likelihood for each end is calculated, the continuity determination module 163 changes the predefined range in such a manner as to widen the range for each end as the likelihood is higher, to make it easier to determine that the end and the end of the back-surface image corresponding to that end are continuous.

The first threshold value is set, for example, at a value equal to or greater than four and equal to or smaller than 16. The continuity determination module 163 corrects the first threshold value in such a manner that the first threshold value will be greater as the likelihood is higher, to make it easier to determine that the front-surface image and the back-surface image are continuous. The continuity determination module 163 may correct the difference value calculated for each end of the front-surface image in such a manner as to decrease the difference value as the likelihood is higher. Further, when the likelihood for each end is calculated, the continuity determination module 163 corrects the first threshold value in such a manner as to increase the first threshold value for the end as the likelihood is higher, to make it easier to determine that the end and the end of the back-surface image corresponding to that end are continuous. The continuity determination module 163 may correct the difference value calculated for each end of the front-surface image in such a manner as to decrease the difference value calculated for the end as the likelihood is higher.

The second threshold value is set, for example, as equal to or greater than 25% and equal to or smaller than 75%. The continuity determination module 163 corrects the second threshold value in such a manner as to decrease the second threshold value as the likelihood is higher, to make it easier to determine that the front-surface image and the back-surface image are continuous. The continuity determination module 163 may correct the ratio in such a manner as to increase the ratio calculated for the candidate end for synthesis as the likelihood is higher. Further, when the likelihood for each end is calculated, the continuity determination module 163 corrects the second threshold value in such a manner as to decrease the second threshold value as the likelihood for the candidate end for synthesis is higher or the likelihoods for the other ends are lower, to make it easier to determine that the end and the end of the back-surface image corresponding to that end are continuous. The continuity determination module 163 may correct the ratio calculated for the candidate end for synthesis in such a manner as to increase the ratio as the likelihood for the candidate end for synthesis is higher or the likelihoods for the other ends are lower.

The continuity determination module 163 need only to change or correct at least one of the predefined range, the first threshold value, the difference value, the second threshold value, and the ratio and may change or correct parameters for any combination. The continuity determination module 163 can adjust the determination sensitivity easily and appropriately by changing or correcting the parameters.

As described in detail above, the image reading apparatus 100 determines whether or not the first end of the front-surface image and the second end of the back-surface image are continuous, based on the front-surface image and the back-surface image and the features of the conveyed document. Thus, the image reading apparatus 100 can determine more accurately whether or not it is preferable to synthesize the front-surface image and the back-surface image of the conveyed document.

In particular, the image reading apparatus 100 changes the criteria on which to determine whether or not the front-surface image and the back-surface image are continuous based on the front-surface image and the back-surface image, based on the features of the conveyed document. Thus, even when a multiple-sheet document with common headings printed at ends thereof is conveyed, it is easier for the image reading apparatus 100 to determine not to synthesize the images of the document unless the document is folded in two. Further, even when a multiple-sheet document with no content printed at ends thereof is conveyed, it is easier for the image reading apparatus 100 to determine to synthesize the images of the document when the document is folded in two. Thus, the image reading apparatus 100 can determine whether or not to synthesize the images more accurately than when the determination of whether or not to synthesize the images is carried out based solely on the image features at the ends of the images.

Thus, when the user feeds the image reading apparatus 100 a document folded in two, the user need not give the image reading apparatus 100 an instruction to synthesize the images or attach a particular marker to the document to indicate that the document is folded in two. Thus, the image reading apparatus 100 is more convenient for the user.

Generally, document conveyance apparatuses such as scanners have an ultrasonic sensor and have a function to detect whether or not a multifeed of a document has occurred. The image reading apparatus 100 uses the function and uses the information of whether or not a multifeed of a document has occurred as a feature of the document. Further, the image reading apparatus 100 detects the thickness of the document as a feature of the document by using the ultrasonic sensor for detecting a multifeed. Generally, image reading apparatuses such as scanners have an imaging device for capturing the image of a document. The image reading apparatus 100 uses the imaging device 118 and detects, as a feature of the document, whether or not a distortion has happened in the external shape of the document depicted in the images. Further, the image reading apparatus 100 uses the imaging device 118 and detects the sizes of the images as a feature of the document. In other words, the image reading apparatus 100 detects features of a document with no special sensor and therefore it is possible to curtail increase of the equipment cost. Further, the embodiment can be applied to already shipped image reading apparatuses by updating the software.

Figure 11:
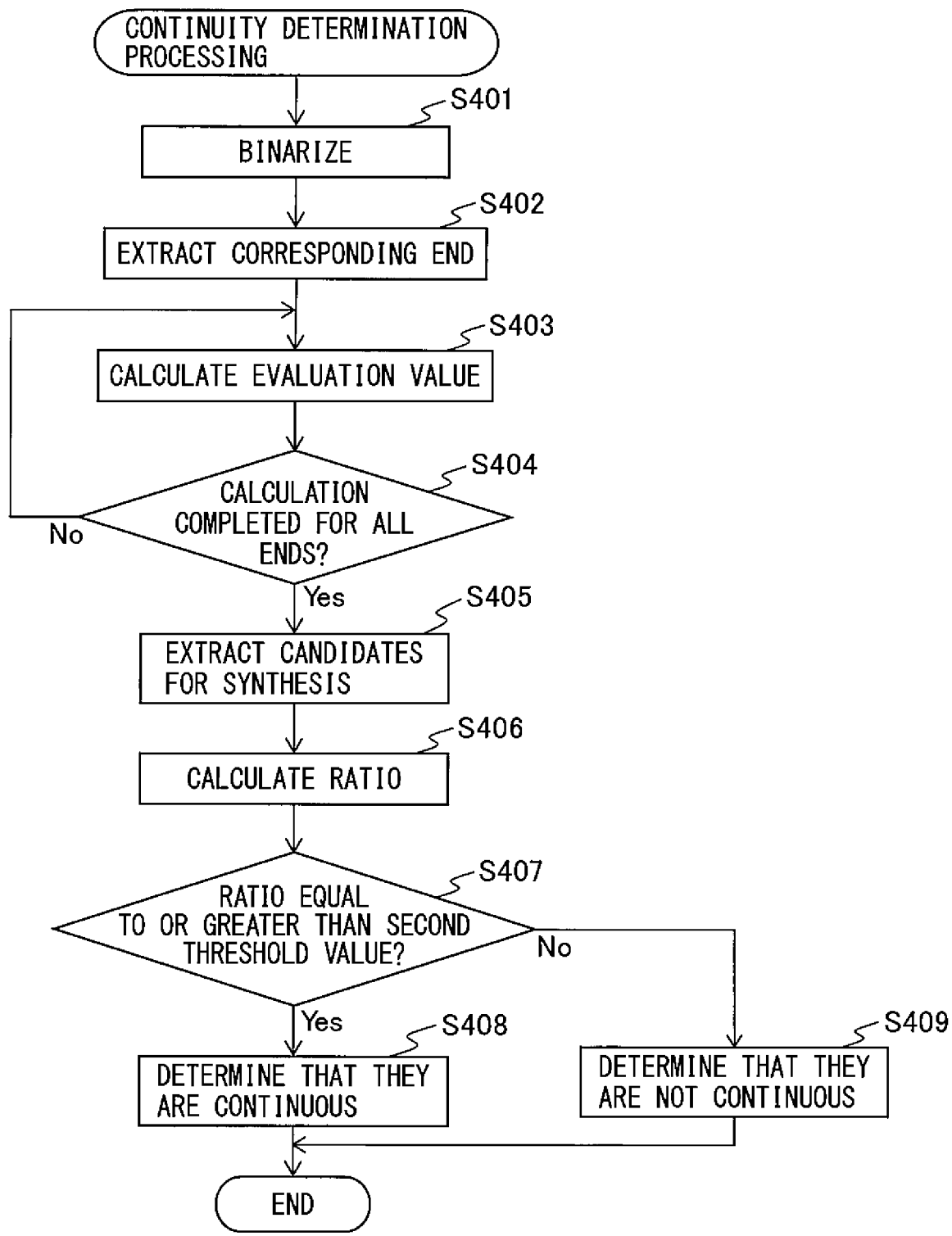
FIG. 11 is a flow chart depicting an example of another operation of continuity determination processing.

FIG. 11 is a flow chart depicting an example of an operation of continuity determination processing according to another embodiment. The continuity determination processing depicted in FIG. 11 is executed in step S208 of the flow chart depicted in FIG. 6 instead of the continuity determination processing depicted in FIG. 10.

First, the continuity determination module 163 binalizes the front-surface image and the back-surface image to generate a binary front-surface image and a binary back-surface image (step S401). The continuity determination module 163 generates binary images in which the pixels are separated to background pixels (white pixels) and non-background pixels (black pixels) by binarizing the luminance values of the pixels in each image, using a predefined threshold value. The threshold value is set, for example, at the median of the values that the luminance value can take (e.g., 128).

Next, similarly to step S301 in FIG. 10, the continuity determination module 163 extracts the ends of the back-surface image that respectively correspond to the four ends of the front-surface image and extracts the ends of the binary back-surface image that respectively correspond to the four ends of the binary front-surface image (step S402).

Next, the continuity determination module 163 calculates the respective evaluation values for the four ends of the front-surface image (step S403). First, the continuity determination module 163 extracts non-background pixels at a particular end of the binary front-surface image. The continuity determination module 163 determines whether or not a non-background pixel exists at the end of the binary back-surface image corresponding to the particular end, within a predefined range from the position corresponding to the position of each of the extracted non-background pixels (the position adjacent to the position of each of the extracted non-background pixel when the two ends adjoin each other). The continuity determination module 163 calculates, as the evaluation value for each end, the number of the non-background pixels of the binary front-surface image for each of which a non-background pixel exists in the binary back-surface image within the predefined range from the position corresponding to the position of the non-background pixel of the binary front-surface image.

Next, the continuity determination module 163 determines whether or not evaluation values have been calculated for all four of the binary front-surface images (step S404).

When there is an end for which no evaluation value has yet been calculated, the continuity determination module 163 returns the process to step S403 and calculates the evaluation value for the end for which no evaluation value has yet been calculated. When evaluation values have been calculated for all ends of the binary front-surface image, the continuity determination module 163 extracts, as candidate ends for synthesis, the end of the front-surface image corresponding to the end of the binary front-surface image with the highest evaluation value (the end at the same position) and the end of the back-surface image corresponding to that end (step S405).

The operation in steps S406 to S409 is the same as the one in steps S305 to S308 of FIG. 10 and will not be described in further detail.

The positions (coordinates) at which non-background pixels exist in the binary front-surface image and in the binary back-surface image correspond to the positions (coordinates) at which non-background pixel exist in the front-surface image and the back-surface image. In other words, based on the number of the non-background pixels at the first end of the front-surface image for each of which a non-background pixel exists within a predefined range from the positions at the second end of the back-surface image, the positions corresponding to the positions at which non-background pixels exist at the first end, the continuity determination module 163 determines whether or not the first end and the second end are continuous. The continuity determination module 163 determines whether or not the ends are continuous, based on the continuity of non-background pixels and therefore the determination accuracy is improved.

The predefined range and the second threshold value used in the continuity determination processing are examples of the predefined criteria and are predefined and changed in step S208 of FIG. 6.

For example, the minimum range of the predefined range is set at equal to or less than one pixel and the maximum range of the predefined range is set at equal to or fewer than five pixels. The continuity determination module 163 changes the predefined range in such a manner as to increase the predefined range as the likelihood calculated by the feature detection module 162 is higher, to make it easier to determine that the front-surface image and the back-surface image are continuous. When likelihood is calculated for each end, the continuity determination module 163 changes the predefined range for each end in such a manner as to increase the predefined range as the likelihood is higher, to make it easier to determine that the end and the end of the back-surface image corresponding to that end are continuous.

The ratio and/or the second threshold value used for this continuity determination processing is/are corrected in a similar manner to the ratio and/or the second threshold value used for the continuity determination processing in FIG. 10.

Note that the continuity determination module 163 may change or correct at least one of the predefined range, the second threshold value, and the ratio and may change or correct parameters for any combination. The continuity determination module 163 can adjust the determination sensitivity easily and appropriately by changing or correcting the parameters.

The image reading apparatus 100 according to the present embodiment can also produce effects similar to the effects described above.

Figure 12:
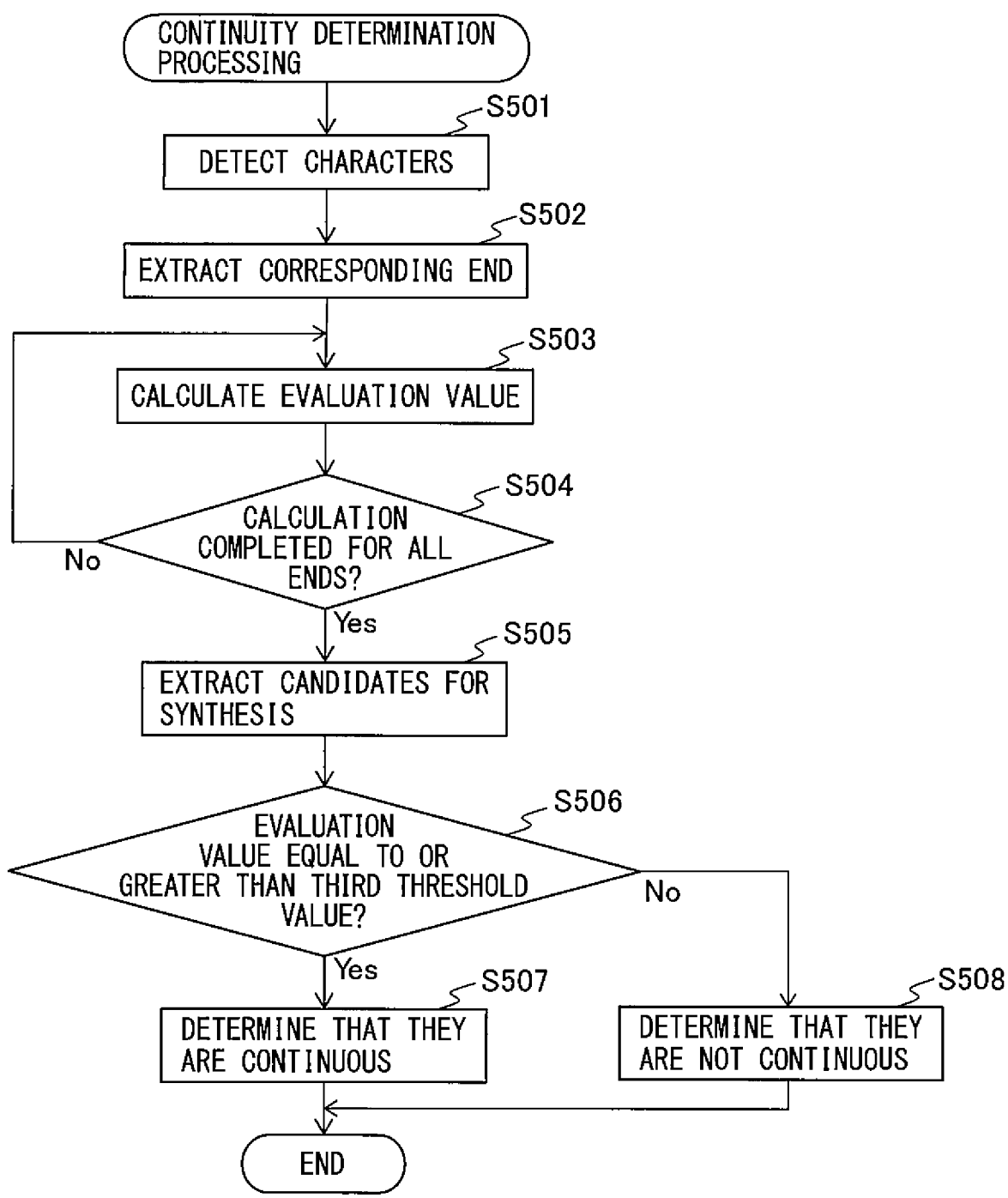
FIG. 12 is a flow chart depicting an example of yet another operation of continuity determination processing.

FIG. 12 is a flow chart depicting an example of an operation of continuity determination processing according to yet another embodiment. The continuity determination processing depicted in FIG. 12 is executed in step S208 of the flow chart depicted in FIG. 6 instead of the continuity determination processing depicted in FIG. 10. When the continuity determination processing according to this embodiment is to be executed, the image reading apparatus 100 stores a plurality of words in the first storage device 140 in advance.

First, the continuity determination module 163 detects characters from the front-surface image and the back-surface image by using a known optical character recognition (OCR) technique and stores in memory the positions (coordinates) at which characters have been detected (step S501).

Next, the continuity determination module 163 extracts the ends of the back-surface image that respectively correspond to the four ends of the front-surface image in a similar manner to step S301 in FIG. 10 (step S502).

Next, the continuity determination module 163 calculates the respective evaluation values for the four ends of the front-surface image (step S503). The continuity determination module 163 extracts groups of characters detected from the front-surface image within a predefined range from a particular end and continuously positioned in a direction perpendicular to the direction in which the particular end extends. Next, the continuity determination module 163 extracts the groups of characters detected from the back-surface image within a predefined range from the positions corresponding to the positions at which the groups of characters have been detected at the end corresponding to the particular end (the adjacent position when the two ends adjoin) and continuously positioned in a direction perpendicular to the direction in which the corresponding end extends. Note that a group of characters may include any number of characters and may include a single character. The continuity determination module 163 calculates, as the evaluation value for each end, the number of the groups of characters that correspond to the words stored in the first storage device 140, wherein each group of characters is formed by connecting a group of characters extracted at each end of the front-surface image with a group of characters extracted at the end of the back-surface image corresponding to that end.

Next, the continuity determination module 163 determines whether or not evaluation values have been calculated for all four ends of the front-surface image (step S504).

When there is an end for which no evaluation value has yet been calculated, the continuity determination module 163 returns the process to step S503 and calculates the evaluation value for the end for which no evaluation value has been calculated. When evaluation values have been calculated for all ends of the front-surface image, the continuity determination module 163 extracts as candidate ends for synthesis the end of the front-surface image with the highest evaluation value and the end of the back-surface image corresponding to that end (step S505).

Next, the continuity determination module 163 determines whether or not the evaluation value (total number) calculated for the end extracted as the candidate end for synthesis is equal to or greater than a third threshold value (step S506).

When the calculated evaluation value is equal to or greater than the third threshold value, the continuity determination module 163 determines that the candidate end for synthesis of the front-surface image and the candidate end for synthesis of the back-surface image are continuous (step S507) and ends the series of steps.

When the calculated evaluation value is smaller than the third threshold value, the continuity determination module 163 determines that the end of the front-surface image and the end of the back-surface image are not continuous (step S508) and ends the series of steps.

When a group of characters formed by connecting a group of characters extracted from the front-surface image with a group of characters extracted from the back-surface image corresponds to a word registered in advance, the character extracted from the front-surface image and positioned most closely to the end of the front-surface image is related to the character extracted from the back-surface image and positioned most closely to the end of the back-surface image. In other words, the continuity determination module 163 determines whether or not the first end and the second end are continuous, based on the result of comparison of the total number of characters that are detected from the back-surface image and correspond to the characters detected from the front-surface image with the third threshold value. The continuity determination module 163 determines whether or not the ends are continuous, based on the continuity of characters and therefore the determination accuracy is improved.

The third threshold value used for this continuity determination processing is an example of the predefined criteria and are predefined and corrected in step S208 of FIG. 6.

The third threshold value is set at a value of equal to or more than one word and equal to or fewer than three words. The continuity determination module 163 corrects the third threshold value in such a manner as to decrease the third threshold value as the likelihood is higher, to make it easier to determine that the front-surface image and the back-surface image are continuous. Note that the continuity determination module 163 may correct the difference value in such a manner as to increase the calculated difference value as the likelihood is higher. Further, when the likelihood is calculated for each end, the continuity determination module 163 corrects the third threshold value for each end in such a manner as to decrease the third threshold value to be compared with the end as the likelihood is higher, to make it easier to determine that the end and the end of the back-surface image corresponding to that end are continuous. Note that the continuity determination module 163 may correct the difference value for each end in such a manner as to increase the difference value calculated for the end as the likelihood is higher. The continuity determination module 163 can adjust determination sensitivity easily and appropriately by changing or correcting the parameters.

The image reading apparatus 100 according to the present embodiment can also produce effects similar to the effects described above.

FIG. 13 is a block diagram depicting a schematic configuration of a first processing circuit 180 according to another embodiment.

The first processing circuit 180 executes overall processing, determination processing, continuity determination processing, etc., in place of the first CPU 160. The first processing circuit 180 includes an image generation circuit 181, a feature detection circuit 182, a continuity determination circuit 183, a synthesis circuit 184, an image output circuit 185, etc.

The image generation circuit 181 is an example of an image generation module and has a function similar to the image generation module 161. The image generation circuit 181 acquires a front-surface input image and a back-surface input image from the imaging device 118, generates a front-surface image and a back-surface image from the acquired images, and outputs the front-surface image and the back-surface image to the feature detection circuit 182, the continuity determination circuit 183, the synthesis circuit 184, and the image output circuit 185.

The feature detection circuit 182 is an example of a feature detection module and has a function similar to the feature detection module 162. The feature detection circuit 182 acquires the output signal from the ultrasonic sensor 114 and acquires the front-surface image and the back-surface image from the image generation circuit 181, detects a feature of the conveyed document from the acquired pieces of information, and outputs feature information that indicates the detected feature to the continuity determination circuit 183.

The continuity determination circuit 183 is an example of a continuity determination module and has a function similar to the continuity determination module 163. The continuity determination circuit 183 acquires the front-surface image and the back-surface image from the image generation circuit 181 and acquires the feature information from the feature detection circuit 182 and, based on the acquired pieces of information, determines whether or not the first end of the front-surface image and the second end of the back-surface image are continuous. The continuity determination circuit 183 outputs the result of the determination to the synthesis circuit 184.

The synthesis circuit 184 is an example of a synthesis module and has a function similar to the synthesis module 164. The synthesis circuit 184 acquires the front-surface image and the back-surface image from the image generation circuit 181 and acquires the result of the determination from the continuity determination circuit 183 and, when it has been determined that the first end and the second end are continuous, synthesizes the front-surface image and the back-surface image and outputs the synthesized image to the image output circuit 185.

The image output circuit 185 is an example of an image output module and has a function similar to the image output module 165. The image output circuit 185 acquires the front-surface image and the back-surface image from the image generation circuit 181 and acquires the synthesized image from the synthesis circuit 184 and outputs the acquired images to the first interface device 135.

The image reading apparatus 100 according to the present embodiment can also produce effects similar to the effects described above.

Although the embodiments have been described with preferable embodiments above, it is not limited to these embodiments. For example, the information processing apparatus 200 may execute a part of the overall processing. In such a case, a second storage device 220 stores programs and data stored in the first storage device 140 and the second CPU 240 functions as the modules of the first CPU 160. Alternatively, a second processing circuit 260 includes the circuits included in the first processing circuit 180.

For example, in step S104 in FIG. 6, the first CPU 160 transmits the acquired front-surface input image and the back-surface input image via the first interface device 135 to the information processing apparatus 200. The information processing apparatus 200 acquires the front-surface input image and the back-surface input image via the second interface device 203 and generates the front-surface image and the back-surface image. In step S105, the first CPU 160 transmits the acquired output signal to the information processing apparatus 200 via the first interface device 135. The information processing apparatus 200 acquires the output signal via the second interface device 203. The information processing apparatus 200 executes the operation in step S106 to S108 and the operation in step S109 is skipped.

Note that the modules of the image reading apparatus and the modules of the information processing apparatus can be disposed in various ways as appropriate in the image reading apparatus or the information processing apparatus. To provide an image processing service in the form of cloud computing, a plurality of information processing apparatuses may be dispersed on a network, where the information processing apparatuses may be caused to collaborate in performing processes allocated to the apparatuses.

According to the image processing apparatus, the control method, and the computer-readable, non-transitory medium storing a computer program, it is possible to determine more accurately whether or not a conveyed document is a kind of document for which it is appropriate to synthesize the image captured of the front surface thereof and the image captured of the back surface thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus comprising:
a processor for
generating a front-surface image captured of a front surface of a conveyed document and a back-surface image captured of a back surface of the conveyed document;
detecting a feature of the conveyed document;
calculating a calculated value from the generated front-surface image and the back-surface image;
determining whether a first end of the front-surface image and a second end of the back-surface image corresponding to the first end are continuous, based on comparing to the calculated value; and
synthesizing the front-surface image and the back-surface image when it has been determined that the first end and the second end are continuous, wherein
the processor corrects the calculated value or a threshold value for comparing to the calculated value, or changes a range for calculating the calculated value in the front-surface image or the back-surface image, based on the detected feature.

2. The image processing apparatus according to claim 1, further comprising:
an ultrasonic transmitter for outputting an ultrasonic wave; and
an ultrasonic receiver for, arranged to face the ultrasonic transmitter, generating an output signal according to the received ultrasonic wave,
wherein the processor detects as the feature whether a multifeed of the conveyed document has occurred, based on the output signal.

3. The image processing apparatus according to claim 2, wherein the processor further detects as the feature a thickness of the conveyed document, based on the output signal.

4. The image processing apparatus according to claim 1, wherein the processor detects as the feature whether a distortion has occurred in an external shape of the document depicted in the front-surface image or the back-surface image.

5. The image processing apparatus according to claim 1, wherein the processor
calculates an average value of gradient values of pixels within a predefined range from pixels corresponding to the first end with an average value of gradient values of pixels within the predefined range from pixels corresponding to the second end, as the calculated value,
determines whether the first end and the second end are continuous, based on a result of a comparison of the average value of gradient values of pixels within the predefined range from pixels corresponding to the first end with the average value of gradient values of pixels within the predefined range from pixels corresponding to the second end, and changes the predefined range, as the range for calculating the calculated value, based on the detected feature.

6. The image processing apparatus according to claim 1, wherein the processor
calculates a difference value between an average value of gradient values of pixels within a predefined range from pixels corresponding to the first end and an average value of gradient values of pixels within the predefined range from pixels corresponding to the second end, as the calculated value,
determines whether the first end and the second end are continuous, based on a result of a comparison of the threshold value with the difference value, and
corrects the threshold value or the difference value, based on the detected feature.

7. The image processing apparatus according to claim 1, wherein the processor
calculates the number of non-background pixels at the first end for each of which a non-background pixel exists within a predefined range from the position at the second end corresponding to the position at the first end at which the non-background pixel exists, as the calculated value,
determines whether the first end and the second end are continuous, based on the number of non-background pixels, and
changes the predefined range, as the range for calculating the calculated value, based on the detected feature.

8. The image processing apparatus according to claim 1, wherein the processor
calculates an evaluation value for each of four ends of the front-surface image, the evaluation value indicating a degree to which each end and an end of the back-surface image corresponding to said end are continuous,
calculates a ratio of the evaluation value of the first end to the sum of the evaluation values of the four ends, as the calculated value,
determines whether the first end and the second end are continuous, based on a result of a comparison of a second threshold value with the ratio, and
changes the second threshold value or the ratio, based on the detected feature.

9. The image processing apparatus according to claim 1, wherein the processor
detects one or more characters from the front-surface image and the back-surface image,
calculates the total number of the one or more characters detected from the back-surface image and corresponding to the one or more characters detected from the front-surface image,
determines whether the first end and the second end are continuous, based on a result of a comparison of a threshold value with the total number, and
corrects the threshold value or the total number, based on detected feature.

10. A control method of an image processing apparatus, comprising:
generating a front-surface image captured of a front surface of a conveyed document and a back-surface image captured of a back surface of the conveyed document;
detecting a feature of the conveyed document;
calculating a calculated value from the generated front-surface image and the back-surface image;
determining whether a first end of the front-surface image and a second end of the back-surface image corresponding to the first end are continuous, based on comparing to the calculated value;

synthesizing the front-surface image and the back-surface image when it has been determined that the first end and the second end are continuous; and correcting the calculated value or a threshold value for comparing to the calculated value, or changes a range for calculating the calculated value in the front-surface image or the back-surface image, based on the detected feature.

11. A computer-readable, non-transitory medium storing a computer program, wherein the computer program causes an image processing apparatus to execute a process, the process comprising:

generating a front-surface image captured of a front surface of a conveyed document and a back-surface image captured of a back surface of the conveyed document;

detecting a feature of the conveyed document;

calculating a calculated value from the generated front-surface image and the back-surface image;

determining whether a first end of the front-surface image and a second end of the back-surface image corresponding to the first end are continuous, based on comparing to the calculated value;

synthesizing the front-surface image and the back-surface image when it has been determined that the first end and the second end are continuous; and correcting the calculated value or a threshold value for comparing to the calculated value, or changes a range for calculating the calculated value in the front-surface image or the back-surface image, based on the detected feature.

* * * * *